(12) United States Patent
Ikuta

(10) Patent No.: US 9,280,011 B2
(45) Date of Patent: *Mar. 8, 2016

(54) DISPLAY DEVICE AND TELEVISION RECEIVER

(71) Applicant: Sharp Kabushiki Kaisha, Osaka (JP)

(72) Inventor: Jo Ikuta, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,029

(22) PCT Filed: Mar. 7, 2013

(86) PCT No.: PCT/JP2013/056242
§ 371 (c)(1),
(2) Date: Sep. 9, 2014

(87) PCT Pub. No.: WO2013/137096
PCT Pub. Date: Sep. 19, 2013

(65) Prior Publication Data
US 2015/0055026 A1    Feb. 26, 2015

(30) Foreign Application Priority Data

Mar. 12, 2012 (JP) .................. 2012-054794

(51) Int. Cl.
*G02F 1/1333* (2006.01)
*H04N 9/30* (2006.01)
*H04N 5/64* (2006.01)
*G02F 1/1335* (2006.01)
*F21V 8/00* (2006.01)

(52) U.S. Cl.
CPC ........ *G02F 1/133308* (2013.01); *G02B 6/0088* (2013.01); *G02F 1/133524* (2013.01); *G02F 1/133603* (2013.01); *G02F 1/133605* (2013.01); *H04N 5/64* (2013.01); *H04N 9/30* (2013.01); *G02F 1/133615* (2013.01); *G02F 2001/133314* (2013.01); *G02F 2001/133317* (2013.01); *G02F 2001/133354* (2013.01)

(58) Field of Classification Search
None
See application file for complete search history.

(56) References Cited

U.S. PATENT DOCUMENTS

| 8,894,230 | B2 * | 11/2014 | Tomomasa | ........ G02F 1/133308 349/58 |
| 2014/0232945 | A1 * | 8/2014 | Uno | .................. G02F 1/133615 348/739 |
| 2015/0219954 | A1 * | 8/2015 | Kubo | ................ G02F 1/133308 348/794 |

FOREIGN PATENT DOCUMENTS

JP            11-337937 A    12/1999

*Primary Examiner* — Ashok Patel
(74) *Attorney, Agent, or Firm* — Chen Yoshimura LLP

(57) ABSTRACT

A liquid crystal display device is provided with: a light-emitting diode LED; a liquid crystal panel; a light guide plate having an end surface that is disposed in such a manner as to face the LED, and having edge portions that are disposed further to the outside than the ends of the liquid crystal panel; holding members comprising a frame and a chassis that hold the liquid crystal panel and the light guide plate in a form in which the liquid crystal panel and the light guide plate are sandwiched between a display surface and the opposite side thereof, and accommodating the LED therebetween; panel pressing sections provided to the frame; second screw attachment sections provided to the frame; second screw members that are attached to the second screw attachment sections, and secure the frame and chassis in an assembled state by sandwiching at least the chassis between the second screw attachment sections; and hole-like sections that are provided to the edge portions of the light guide plate, and through which either the second screw attachment sections or the second screw members are inserted.

15 Claims, 22 Drawing Sheets

DISPLAY DEVICE AND TELEVISION RECEIVER

TECHNICAL FIELD

The present invention relates to a display device and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. In the liquid crystal display device, a liquid crystal panel used therein does not emit light, and therefore, it is necessary to separately provide a backlight device as an illumination device. Backlight devices are largely categorized into a direct-lighting type and an edge-lighting type depending on the mechanism thereof. In order to make the liquid crystal display device even thinner, it is preferable to use an edge-lighting type backlight device, and a known example thereof is disclosed in Patent Document 1 below.

RELATED ART DOCUMENT

Patent Document

Patent Document 1: Japanese Patent Application Laid-Open Publication No. H11-337937

Problems to be Solved by the Invention

A liquid crystal display device in general has a configuration in which a liquid crystal panel is sandwiched by a panel pressing member on the front side and a panel receiving member on the rear side. In order to satisfy demands for a reduction in manufacturing cost or a further reduction in thickness and the like, elimination of the panel receiving member on the rear side is possible, for example. However, the panel receiving member had the function of supporting the edge portions of the liquid crystal panel from the rear side and blocking light from entering the liquid crystal panel from the rear side. Thus, simply eliminating the panel receiving member results in the risk of light leakage through gaps formed due to deformations such as warping and bending of the panel pressing member.

SUMMARY OF THE INVENTION

The present invention was completed in view of the above-mentioned situation, and an object thereof is to suppress light leakage.

Means for Solving the Problems

A display device, including: a light source; a display panel that performs display with light from the light source; disposed below the display panel the light guide plate being disposed such that an edge face thereof faces the light source and such that an edge portion thereof is arranged further outside than an edge portion of the display panel; a holding member including a pair of holding portions that holds and sandwiches the display panel and the light guide plate from the display surface side and a side opposite to the display surface side, the holding member housing the light source between the pair of holding portions; a panel pressing member provided on one of the pair of holding portions disposed on the display surface side of the display panel, the panel pressing member pressing the display panel from the display surface side; a fastening member attaching section provided on one holding portion of the pair of holding portions; a fastening member attached to the fastening member attaching section, the fastening member holding at least another holding portion of the pair of holding portions with the fastening member attaching section so as to fix together the pair of holding portions, wherein a hole is provided in the edge portion of the light guide plate where either the fastening member attaching section or the fastening member is inserted.

With this configuration, the light emitted from the light source enters the edge face of the light guide plate and is guided into the display panel after the light is transmitted within the light guide plate, the light being used to display an image on the display panel. The display panel is pressed from the display surface side by one of the pair of panel pressing portions, which is the one disposed on the display surface side of the display panel. The fastening member attaching section that is provided on one of the pair of holding portions has at least the fastening member attached while holding the other holding portion with the one holding portion, and the holding portions are fixed to each other to sandwich therebetween the display panel and the light guide plate that are stacked one on top of another. Either one of the fastening member attaching section and the fastening member is configured so as to be inserted into the hole provided on the edge portion of the light guide plate, and thus, compared to a case in which the fastening member attaching section and the fastening member are disposed further outside than the edge portion of the light guide plate, the pair of holding portions are fixed at a closer position to the panel pressing member. As a result, the distance between the fastening member attaching section and the fastening location of the fastening member for the holding portion disposed on the display surface side of the display panel becomes shorter, and thus, deformations such as warping and bending are less likely to occur between the fastening location and the panel pressing portion of the holding portion that is disposed towards the display surface side, and the panel pressing member is less likely to move away from the display panel. Thus, because a gap is less likely to form between the panel pressing member and the display panel, the light inside is less likely to leak through the gap.

As embodiments of the present invention, the following configurations are preferred. (1) The fastening member is attached to the fastening member attaching section along a direction in which the display panel and the light guide plate are layered. In this manner, the pair of holding portions can firmly hold the display panel and the light guide plate in the direction of overlap using the fastening member and the fastening member attaching section. Due to this, even for configurations without a panel receiving member disposed between the light guide plate and the display panel, the display panel and the light guide plate can be consistently held with enough holding strength, and a gap is even less likely to form between the panel pressing member and the display panel.

(2) The holding portion is disposed on the display surface side of the display panel and the another holding portion is disposed on the side opposite to the display surface side of the light guide plate, wherein the fastening member is attached to the fastening member attaching section from the opposite side to the display surface side. In this manner, the display panel and the light guide plate that are disposed on the opposite side to the display surface side, and one of the holding portions that is disposed on the side opposite to the display surface side are assembled in that order onto the other holding portion that is disposed towards the display surface. Then, the fastening members are attached to the fastening member attaching sections from the opposite side to the display surface side. Because this kind of manufacturing process is possible, excellent assembly productivity and productivity can be attained.

(3) The pair of holding portions are exterior members that constitute an outer form of the display device. In this manner, because the fastening member is harder to perceive from the display surface side, the external appearance of the display device can be made excellent.

(4) The fastening member attaching section is in contact with the edge portion of the display panel so as to fix the position of the display panel in the direction along a display surface. In this manner, the fastening member attaching section provided on one of the holding portions that is disposed towards the display surface side of the display panel is inserted into the hole provided on the edge portion of the light guide plate that is disposed to the opposite side to the display surface side of the display panel, and thus, the fastening member attaching section can protrude farther towards the side opposite to the display surface side than the display panel at a distance similar to the plate thickness of the light guide plate, for example. Therefore, when the display panel is assembled to one of the holding portions, the edge portion of the display panel can be more reliably attached to the fastening member attaching section and the position of the display panel can be more reliably fixed. Furthermore, because the fastening member attaching section is disposed on the location where the edge portion of the display panel will come into contact, the fastening member attaching section will be disposed even closer to the panel pressing member, and as a result, the portion between the fastening member attaching section and the panel pressing member of one of the holding portions is less likely to have warping, bending, or the like, and the panel pressing member is less likely to move away from the display panel. Thus, because a gap is less likely to form between the panel pressing member and the display panel, the light from the light source is less likely to leak through the gap.

(5) The aforementioned fastening member attaching section is inserted into the hole provided in the edge portion of the light guide plate so as to be in contact with an inner surface thereof, and fixes the position of the light guide plate in directions along the surface thereof. In this manner, when one of the holding portions is assembled to the light guide plate, by inserting fastening member attaching sections provided on one of the holding portions into holes of the light guide plate, the position of the light guide plate in the directions along the surface thereof is fixed. In other words, as the position of the light guide plate can be fixed before the step of attaching the other holding portion, the process of fixing the position if the position of the light guide plate is out of place can be done with ease, making the process easier.

(6) The fastening member attaching section is provided with a supporting portion that supports the edge portion of the light guide plate from a side opposite to the fastening member. In this manner, when one of the holding portions is assembled to the light guide plate, by inserting fastening member attaching sections provided on one of the holding portions into holes of the light guide plate, the supporting portion provided on the fastening member attaching sections can support the light guide plate from the side opposite to the edge portion of the light guide plate. As a result, deformations such as warping are less likely to occur to the light guide plate, and thus, the holes provided on the edge portions have greater positioning accuracy, and as a result, the position of the light guide plate can be more accurately fixed.

(7) The one holding portion has an inner holding portion made of a metal that is disposed towards an inside and an outer holding portion made of a synthetic resin that is disposed outside of the inner holding portion, and the fastening member attaching section is provided so as to protrude from the outer holding portion towards the edge portion of the light guide plate, and the inner holding portion has an insertion hole where the fastening member attaching section is inserted. In this manner, if the outer holding portion made of synthetic resin thermally expands or contracts, while there is a risk that the fastening member attaching sections may move relative to the inner holding portion made of a metal, the inner holding portion has the insertion holes where the fastening member attaching sections are inserted, and thus, because the fastening member attaching sections come into contact with the edges of the insertion holes, the fastening member attaching sections can be suppressed from moving.

(8) The one holding portion is disposed towards the display surface side of the display panel, and the fastening member attaching section is in contact with the edge portion of the display panel so as to define the position of the display panel in the directions along the display surface. In this manner, if the outer holding portion made of synthetic resin thermally expands or contracts, because the fastening member attaching sections come into contact with the edges of the insertion holes, the edge portion of the display panel that is fixed by the fastening member attaching section is less likely to be affected by the stress from the fastening member attaching sections. Due to this, the image displayed on the display panel can have excellent display quality.

(9) The light guide plate has a light source facing edge face that is disposed so as to face the light source and a light source non-facing edge face that does not face the light source, and the edge portion of the light guide plate has the light source non-facing edge face and the hole. In this manner, the light from the light source enters the light source facing edge face of the light guide plate and travels through the light guide plate, but as the holes are provided on the edge portions of the light source non-facing edge faces, the light traveling through the light guide plate is less likely to leak from the holes.

(10) The hole has the inner surface that is in contact with either the fastening member attaching section or the fastening member, and fixes the position of the light guide plate in the directions along the surface thereof. In this manner, the position of the light guide plate is fixed in the directions along the surface thereof by either one of the fastening member attaching section and the fastening member of the light guide plate that are inserted into the holes provided on the edge portions. In other words, either one of the fastening member attaching sections and the fastening members that are structures that fix the pair of holding portions also doubles as a structure to fix in position the light guide plate, and thus, compared to a case in which the fixing structure is disposed farther towards the outside than the edge portions of the light guide plate, the occupied space can be reduced and the frame portion of the display device can be made narrower.

(11) A panel connecting member connected to the edge portion of the display panel and disposed so as to protrude outward from the edge portion, wherein the fastening member and the fastening member attaching section are arranged so as to be aligned along the edge portion of the display panel with respect to the panel connecting member. In this manner, the fastening members and the fastening member attaching sections are provided so as to be aligned along the edge portions of the display panel against the panel connecting members that protrude outwards from the edge portions of the display panel, and thus, compared to when the fastening members and the fastening member attaching sections are provided further outwards than the panel connecting members, the frame can be made even narrower.

(12) There exists a plurality of the fastening members, a plurality of the fastening members attaching sections, and a plurality of the panel connecting members, wherein a pair of the plurality of the fastening members and the plurality of the fastening member attaching sections, and the plurality of the panel connecting members are disposed alternately to be aligned along the edge portion of the display panel.

(13) The display panel is a liquid crystal panel made of liquid crystal sealed between a pair of substrates. As a liquid crystal display device, such a display device can be applied to various applications such as a television or the display of a personal computer, for example, and is particularly suitable for large screens.

Effects of the Invention

According to the present invention, it is possible to suppress light leaking.

DETAILED DESCRIPTION OF EMBODIMENTS

<Embodiment 1>

Figure 3:
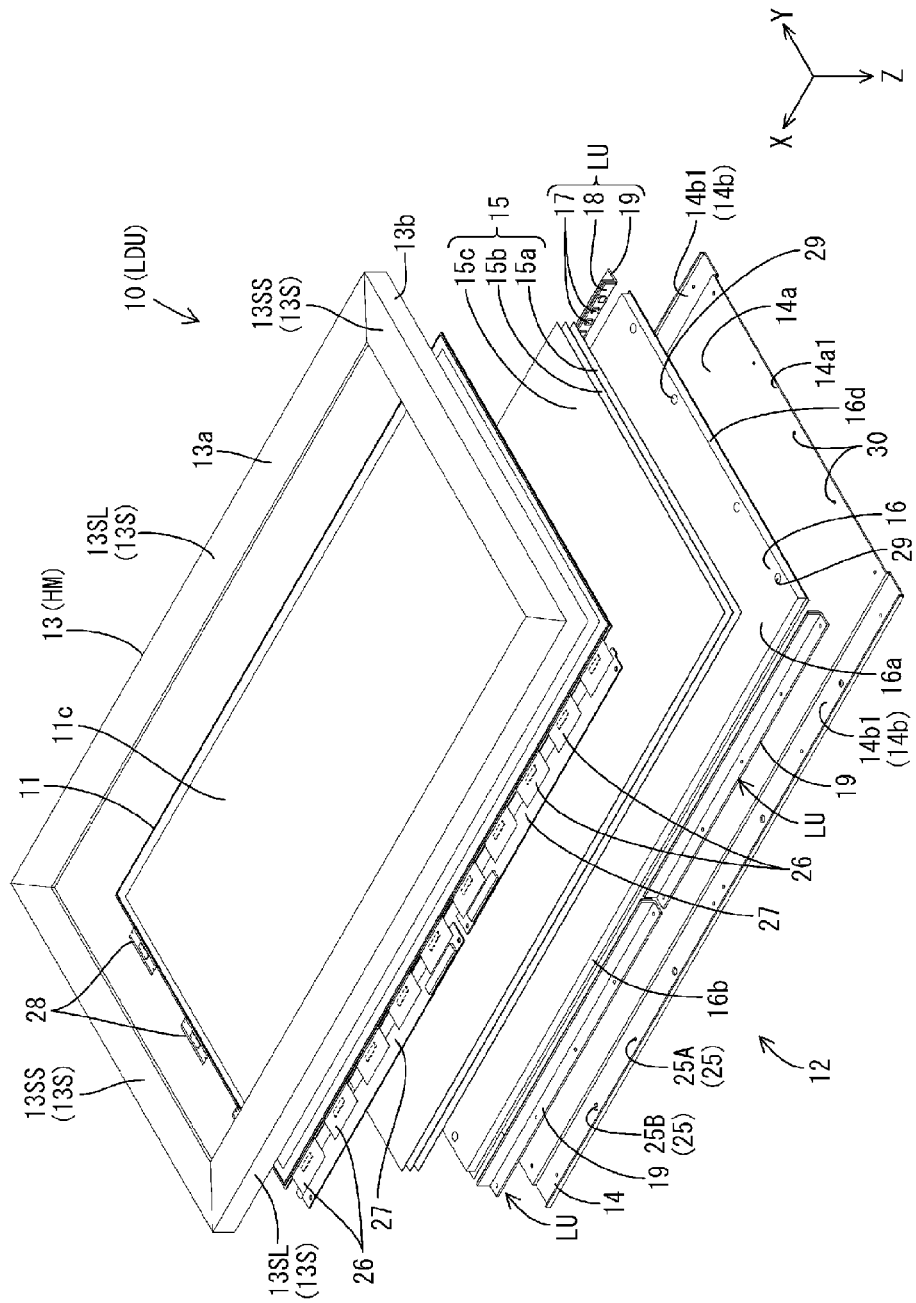
FIG. 3 is an exploded perspective view showing a schematic configuration of a liquid crystal display unit that constitutes a part of the liquid crystal display device.
Figure 4:
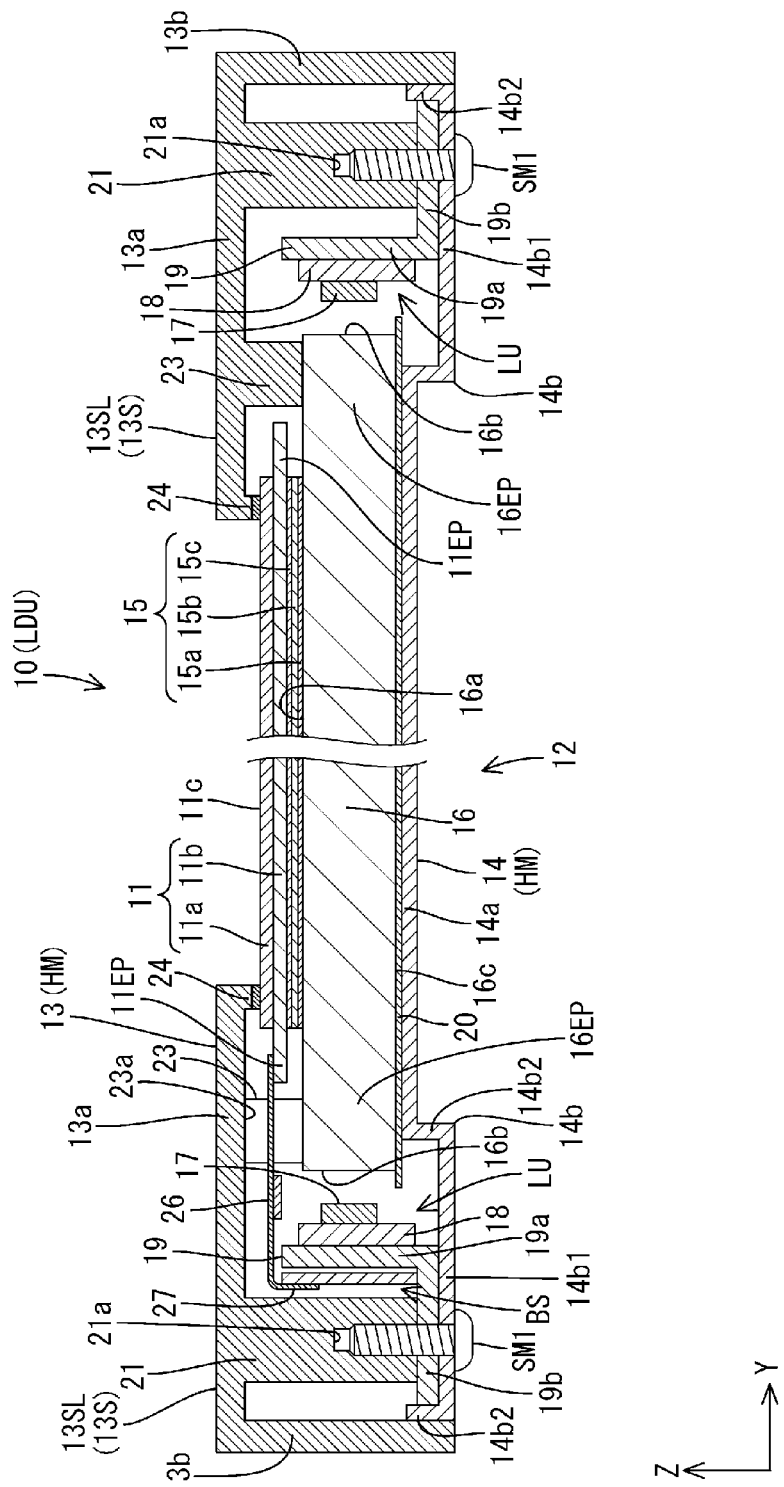
FIG. 4 is a cross-sectional view that shows a cross-sectional configuration of the liquid crystal display device along the shorter side direction.
Figure 5:
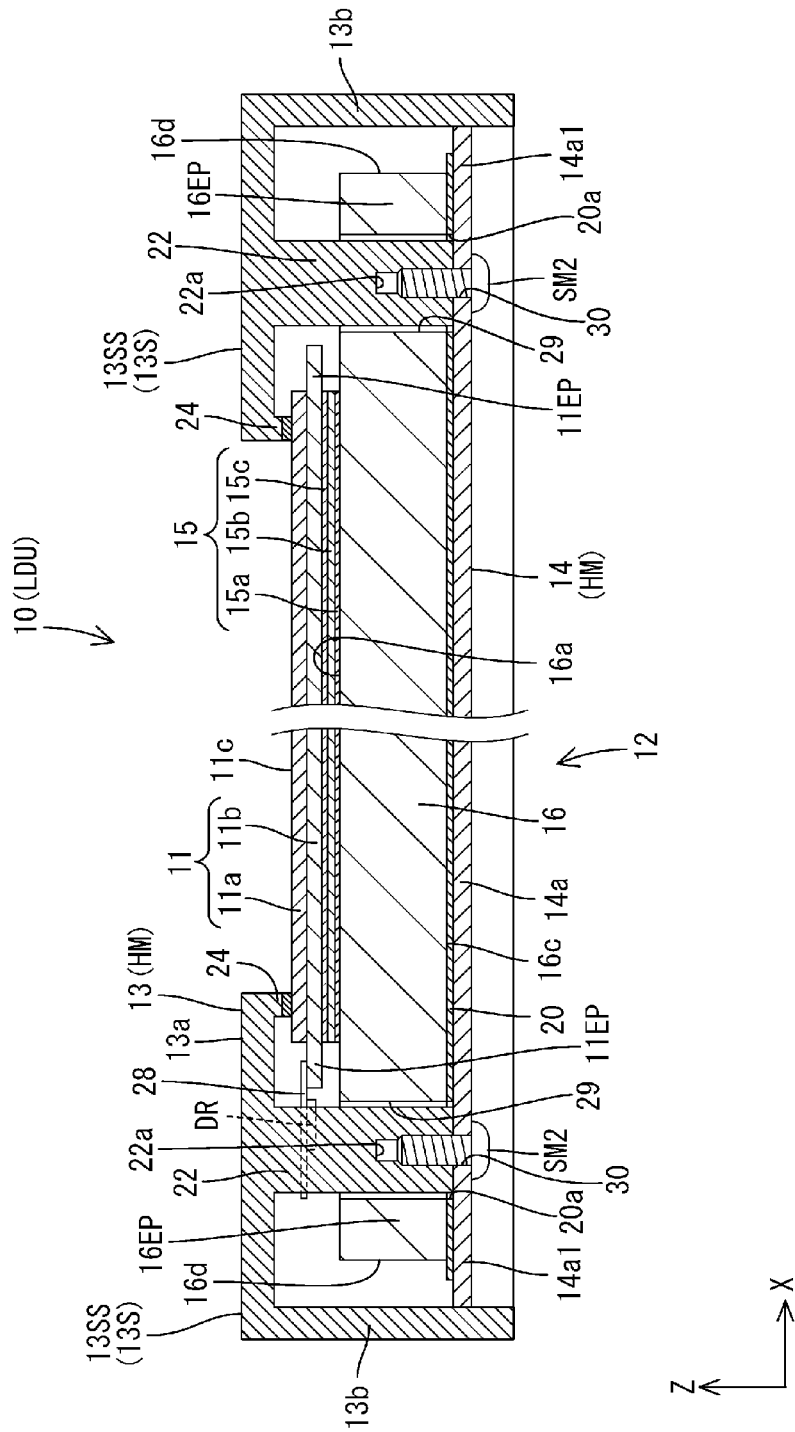
FIG. 5 is a cross-sectional view that shows a cross-sectional configuration of the liquid crystal display device along the longer side direction.

Embodiment 1 of the present invention will be described with reference to FIGS. 1 to 14. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 4 and 5 is the front side, and the bottom side of the same figures is the rear side.

Figure 1:
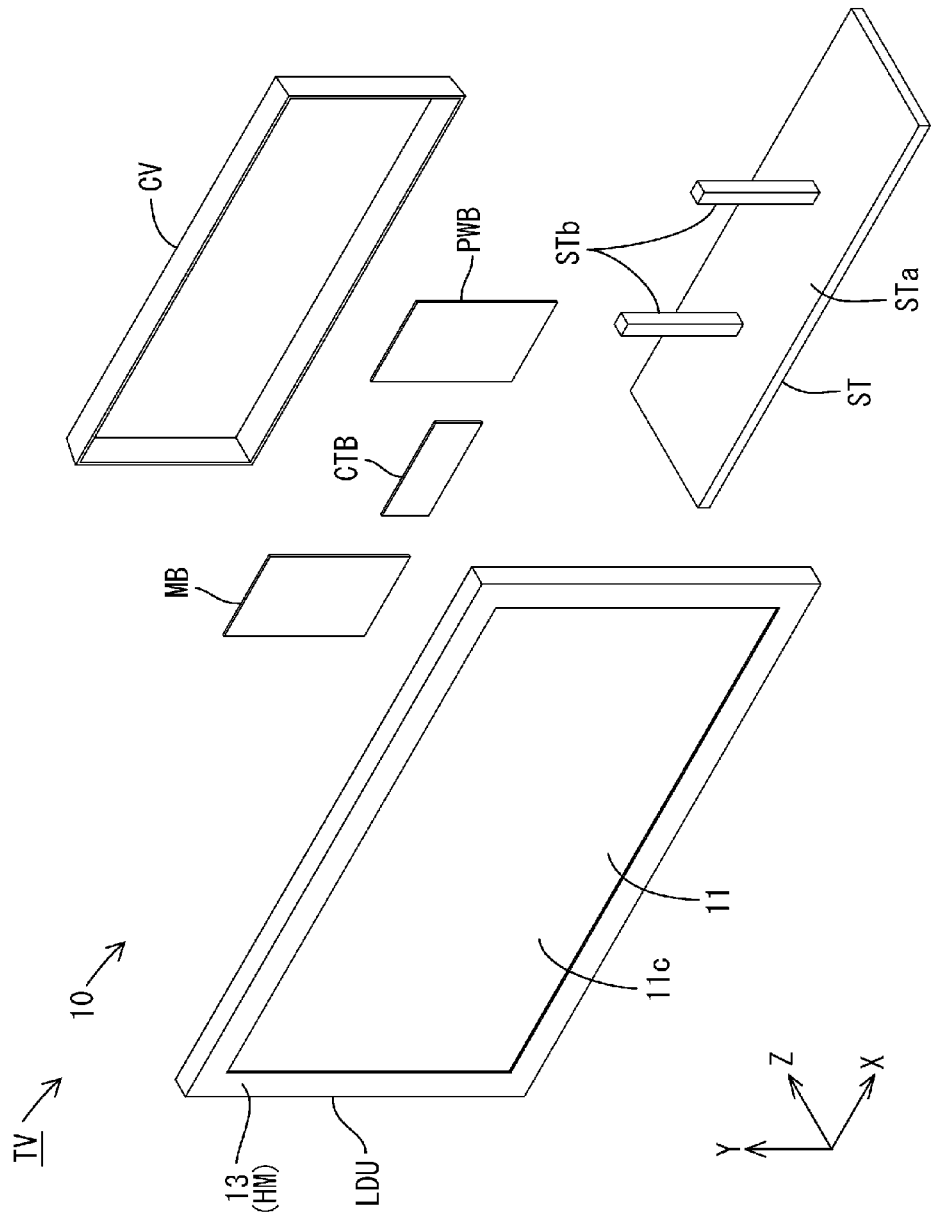
FIG. 1 is an exploded perspective view that shows a schematic configuration of a television receiver and a liquid crystal display device according to Embodiment 1 of the present invention.

As shown in FIG. 1, a television receiver TV according to the present embodiment has a liquid crystal display unit (display unit) LDU, various boards PWB, MB, and CTB attached to the rear side (back side) of the liquid crystal display unit LDU, a cover member CV that is attached to the rear side of the liquid crystal display unit LDU and covers the various boards PWB, MB, and CTB, and a stand ST. The television receiver TV is supported by the stand ST in a state in which the display surface of the liquid crystal unit LDU coincides with the vertical direction (Y axis direction). The liquid crystal display device 10 of the present embodiment is the portion excluding the configuration for receiving television signals (such as a tuner part of a main board MB) from the television receiver TV having the above-mentioned configuration. As shown in FIG. 3, the liquid crystal display unit LDU is formed to be a horizontally-long quadrangle (rectangular shape) as a whole, and includes a liquid crystal panel 11 that is a display panel, and a backlight device (illumination device) 12 that is an external light source. The liquid crystal panel 11 and the backlight device 12 are held as one component by a frame (holding portion disposed on a display surface 11c side, a holding portion) 13 and a chassis (holding portion disposed on a side opposite to the display surface 11c, another holding portion) 14 that are exterior members that constitute the exterior of the liquid crystal display device 10. The frame 13 and the chassis 14 constitute a holding member HM. The chassis 14 of the present embodiment constitutes a part of the exterior member and the holding member HM, and also a part of the backlight device 12.

Figure 2:
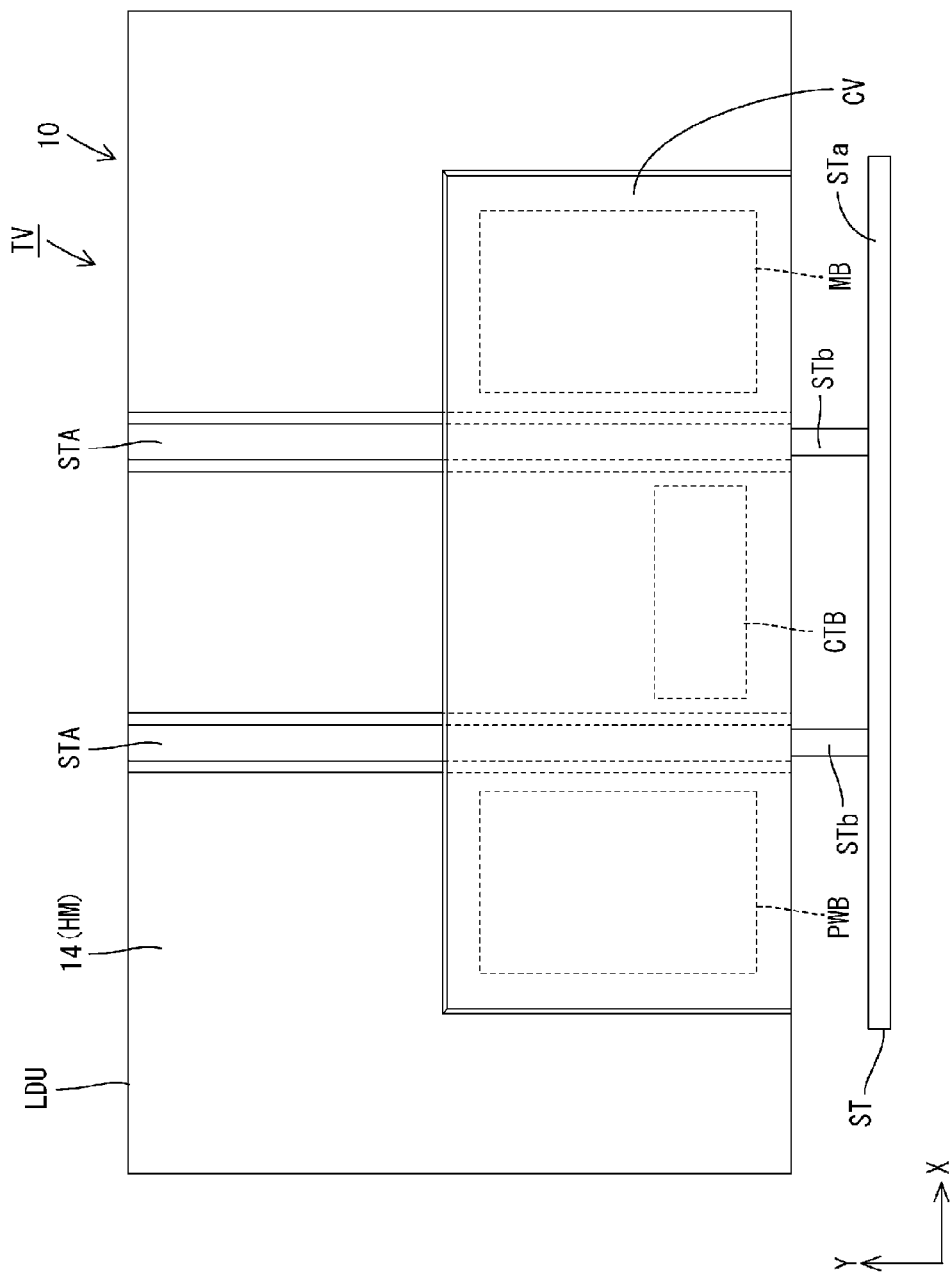
FIG. 2 is a rear view of the television receiver and the liquid crystal display device.

First, the configuration of the rear side of the liquid crystal display device 10 will be explained. As shown in FIG. 2, on the rear of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens toward the chassis 14, and a pair of support columns STb of the stand ST is inserted into respective spaces formed between the stand attachment members STA and the chassis 14, respectively. Wiring members (such as electric wires) connected to an LED substrate 18 of the backlight device 12 run through a space inside of the stand attachment members STA. The stand ST is constituted of a base STa that is disposed in parallel with the X axis direction and the Z axis direction, and the pair of support columns STb standing on the base STa along the Y axis direction. The cover member CV is made of a synthetic resin, and is attached so as to cover about a half of the lower part of the rear side of the chassis 14 of FIG. 2, while extending across the pair of stand attachment members STA along the X axis direction. Between the cover member CV and the chassis 14, a component housing space is provided to house the components mentioned below such as the various boards PWB, MB, and CTB.

As shown in FIG. 2, the various boards PWB, MB, and CTB include a power supply board PWB, the main board MB, and a control board CTB. The power supply board PWB is a power source for the liquid crystal display device 10, and can supply driving power to other boards MB and CTB, LEDs 17 of the backlight device 12, and the like. Therefore, the power supply board PWB doubles as an LED driver substrate that drives the LEDs 17 (light source driver substrate). The main board MB has at least a tuner part that can receive television signals, and an image processing part that performs image-processing on the received television signals (neither the tuner part nor the image processing part is shown in the figure), and can output the processed image signals to the control board CTB described below. When the liquid crystal display device 10 is connected to an external video playback device that is not shown, an image signal from the video playback device is inputted into the main board MB, and the main board MB can output the image signal to the control board CTB after processing the signal at the image processing part. The control board CTB has the function of converting the image signal inputted from the main board MB to a signal for driving liquid crystal, and supplying the converted signal for liquid crystal driving to the liquid crystal panel 11.

As shown in FIG. 3, in the liquid crystal display unit LDU that constitutes a part of the liquid crystal display device 10, main constituting components thereof are housed in a space formed between the frame (front frame) 13 that constitutes the front exterior portion, and the chassis (rear chassis) 14 that constitutes the rear exterior portion. The main constituting components housed between the frame 13 and the chassis 14 include at least the liquid crystal panel 11, optical members 15, a light guide plate 16, and LED units (light source unit) LU. Of these, the liquid crystal panel 11, optical members 15, and light guide plate 16 are held by being sandwiched between the frame 13 on the front side and the chassis 14 on the rear side while being stacked one on top of the other. The backlight device 12 is constituted of the optical members 15, the light guide plate 16, the LED units LU, and the chassis 14, and is the configuration of the liquid crystal display unit LDU described above excluding the liquid crystal panel 11 and the frame 13. Two pairs of the LED units LU, which constitute a portion of the backlight device 12, are arranged along the longer side direction (X axis direction) of the light guide plate 16, and each pair is disposed at the respective sides across the light guide plate 16 in the shorter side direction (Y axis direction); that is, a total of four LED units LU are provided between the frame 13 and the chassis 14. The LED unit LU is constituted of the LEDs 17, which are the light source, the LED substrate (light source substrate) 18 on which the LEDs 17 are mounted, and a heat dissipating member (heat spreader, light source attachment member) 19 to which the LED substrate 18 is attached. The respective constituting components will be explained below.

As shown in FIG. 3, the liquid crystal panel 11 is formed in a horizontally long quadrangular shape (rectangular shape) in a plan view, and is configured by bonding a pair of glass substrates 11a and 11b having high light transmittance to each other with a prescribed gap therebetween, and by sealing liquid crystal between the two substrates 11a and 11b. Of the two substrates 11a and 11b, one on the front side (front surface side) is a CF substrate 11a, and the other on the rear side (rear surface side) is an array substrate 11b. On the array substrate 11b, switching elements (TFTs, for example) connected to source wiring lines and gate wiring lines that intersect with each other, pixel electrodes connected to the switching elements, an alignment film, and the like are provided. Specifically, the array substrate 11b is provided with a plurality of TFTs and pixel electrodes in a line, these TFTs and pixel electrodes having a plurality of gate wiring lines and source wiring lines that are arranged in a grid pattern so as to surround the TFTs and the pixel electrodes. The gate wiring line and the source wiring line are connected respectively to the gate electrode and the source electrode, the pixel electrode being connected to the drain electrode of the TFT. Furthermore, the array substrate 11b has a capacitance wiring line (auxiliary capacitance wiring line, storage capacitance wiring, Cs lines) that is in parallel with the gate capacitance wiring line and are disposed so as to overlap the gate wiring line in a plan view with respect to the pixel electrode, the capacitance wiring line and the gate wiring line being arranged one after another in a line along the Y axis direction. On the other hand, in the CF substrate 11a, color filters having respective colored portions such as R (red), G (green), and B (blue) arranged in a prescribed pattern, an opposite electrode, an alignment film, and the like are provided. Polarizing plates (not shown) are respectively provided on outer sides of the two substrates 11a and 11b.

As shown in FIGS. 4 and 5, the array substrate 11b, which is one of the pair of substrates 11a and 11b that forms the liquid crystal panel 11, is greater in size than the CF substrate 11a when seen in a plan view, the edge of the array substrate being disposed so as to protrude further out than the CF substrate 11a. Specifically, the array substrate 11b is formed slightly larger than the CF substrate 11a so that the entire periphery of the outer edges of the array substrate protrudes further outside of the outer edges of the CF substrate 11a. Among the pair of longer side edge portions 11EP that forms the outer edges of the array substrate 11b, the longer side edge portion 11EP arranged towards the control board CTB (front side in FIG. 3, left side in FIG. 4), a plurality of terminals that are led out from the source wiring lines are provided, each terminal in the source side being connected to a source-side flexible substrate (panel connecting member, source driver) 26 as shown in FIG. 3. The source-side flexible substrates 26 are arranged in a line at intervals along the X axis along an edge portion 11EP in the longer side of the array substrate 11b, the source-side flexible substrate 26 protruding outward along the Y axis direction from the edge portions 11EP in the longer side of the array substrate 11b. On the other hand, a plurality of gate terminals (not shown) drawn from the gate wiring lines and the capacitance wiring lines described above are disposed on one shorter side edge portion 11EP of one (rear side in FIG. 3, left side in FIG. 5) of the pair of edges in the shorter side that forms the outer edges of the array substrate 11b, each terminal in the gate side being connected to a gate-side flexible substrate (panel connecting member, gate driver) 28. A plurality of the gate-side flexible substrates 28 are arranged in a line at intervals along the Y axis along an edge portion 11EP in the shorter side of the array substrate 11b, the flexible substrates 28 protruding outwards along the X axis direction from the edge portion 11EP in the shorter side of the array substrate 11b.

Each of the flexible substrates 26 and 28, as shown in FIG. 3, has a film-like base material made of a synthetic resin material (a polyimide resin, for example) having insulating and flexible characteristics, and a driver (panel driving part) DR, for driving liquid crystal, mounted on the base material, and a plurality of wiring patterns (not shown) formed on the base member, and the wiring patterns are connected to a driver DR mounted near the center of the base member. One end of the flexible substrate 26 is crimp-connected to terminals of the array substrate 11b, and the other end thereof is crimp-connected to terminals of a printed board 27, which will be described later, through anisotropic conductive films (ACF), respectively. The printed substrate 27 is connected to the above-mentioned control board CTB through a wiring member that is not shown, and signals inputted from the control board CTB (scan signals to the gate wiring lines, data signals to the source wiring lines, capacitance signals to the capacitance wiring lines, and the like) can be transmitted to the source-side flexible substrates 26. Meanwhile, one end of the gate-side flexible substrate 28 is crimp-connected to a terminal of the array substrate 11b through anisotropic conductive films. A relay wiring line (not shown) that connects the source terminals to the gate terminals is formed on the array substrate 11b, the source-side flexible substrate 26 and source side terminal portion sending signals (scan signals to gate wiring lines, capacitance signals to capacitance wiring lines, and the like) to the gate-side terminal portion and the gate-side flexible substrate 28 through the relay wiring line. Thus, in the liquid crystal panel 11, an image is displayed on the display surface 11c based on the signals inputted from the control board CTB.

As shown in FIGS. 4 and 5, the liquid crystal panel 11 is stacked on the front side of the optical members 15 described below, and the rear surface thereof (outer surface of a polarizing plate on the rear side) is in close contact with the optical members 15 with almost no gap. With this configuration, it is possible to prevent dust and the like from entering a space between the liquid crystal panel 11 and the optical members 15. The display surface 11c of the liquid crystal panel 11 is constituted of a display region that is in the center of the surface and that can display images, and a non-display region that is in the outer edges of the surface and that is formed in a frame shape surrounding the display region. The respective terminals and the respective flexible substrates 26 and 28 are disposed in the non-display region.

As shown in FIG. 3, the optical members 15 have a horizontally-long quadrangular shape in a plan view as in the liquid crystal panel 11, and the size thereof (shorter side dimension and longer side dimension) is slightly smaller than that of the liquid crystal panel 11. The optical members 15 are stacked one on top of another on the front side (light exiting side, liquid crystal panel 11 side) of the light guide plate 16 mentioned later and are arranged so as to be sandwiched between the liquid crystal panel 11 and the light guide plate 16. Each of the optical members 15 is a sheet-shaped member, and the optical members 15 are constituted of three sheets stacked together. Specifically, the optical members 15 include a diffusion sheet 15a, a lens sheet (prism sheet) 15b, and a reflective polarizing sheet 15c, in that order starting from the rear side (the side with the light guide plate 16). Furthermore, the size of the respective three sheets 15a, 15b, and 15c in a plan view is approximately the same.

The diffusion sheet 15a, which is disposed farthest towards the rear side (the side with the light guide plate 16, the side opposite to the light exiting side) among these sheets, is almost completely transparent (excellent light transmission) and has a large number of diffusing particles dispersed inside the base substrate that is made of synthetic resin and has a sheet shape, the diffusion sheet 15 having the function of dispersing light that is transmitted therethrough. The lens sheet 15b disposed in the center in the direction in which the layers are stacked (Z axis direction) is formed of a sheet-shaped base material that is an almost completely transparent synthetic resin, and the lens sheet 15b is formed of a prism layer formed by being stacked on a surface of the substrate, and can condense transmitted light. A reflective polarizing sheet 15c disposed farthest towards the front side (light exiting side, liquid crystal panel 11 side) has a multilayer structure formed by alternately stacking layers with a different indices of refraction, and the configuration allows the p-wave of the light emitted from the light guide plate 16 to pass while reflecting the s-wave towards the light guide plate 16 side. The s-wave reflected towards the light guide plate 16 is used again as light emitted towards the reflective polarizing sheet 15c after being separated into s-waves and p-waves by a light guide reflective sheet 20 and the like mentioned later, leading to excellent light usage efficiency (brightness).

The light guide plate 16 is made of a synthetic resin (an acrylic resin such as PMMA or a polycarbonate, for example) with a higher refractive index than air and almost completely transparent (excellent light transmission). As shown in FIG. 3, the light guide plate 16 has a horizontally-long quadrangular shape in a plan view, in a manner similar to the liquid crystal panel 11 and the optical members 15, and has a plate shape that is thicker than the optical members 15. The longer side direction on the surface of the light guide plate 16 corresponds to the X axis direction, the shorter side corresponds to the Y axis direction, and the plate thickness direction intersecting with the surface corresponds to the Z axis direction. As shown in FIGS. 4 and 5, the size (shorter side dimension and longer side dimension) of the light guide plate 16 in a plan view is larger than that of the liquid crystal panel 11 and the optical members 15, and the light guide plate 16 is disposed so that an edge portion 16EP protrudes farther out than the edge portion 11EP of the liquid crystal panel 11. Specifically, the light guide plate 16 is formed to be slightly larger than the liquid crystal panel 11 so that the entire periphery of the edge portion 16EP protrudes farther outside than the outer edges of the array substrate 11b. The light guide plate 16 is placed on the rear side of the optical members 15, and is sandwiched between the optical members 15 and the chassis 14. The light guide plate 16 has a pair of LED units LU disposed at respective sides in the shorter side direction, and thus, the light guide plate 16 is interposed therebetween in the Y axis direction, and light from the LEDs 17 enters the respective shorter side edges of the light guide plate 16. The light guide plate 16 has the function of guiding therethrough light from the LEDs 17 that entered from the respective edges in the shorter side direction and emitting the light toward the optical members 15 (front side) while internally propagating this light. The reason for making the light guide plate 16 larger than the liquid crystal panel 11 and the optical members 15 (reason for securing the edge portion 16EP) is to secure enough distance to guide the light from the LEDs 17 to reduce the risk of having uneven light emitted. Furthermore, another reason is that the edge portion 16EP of the light guide plate 16 is more prone to having unevenness of light emitted compared to the center portion, which causes bad display quality at the edge portion 16EP if the light emitted is used for displaying images.

Of the surfaces of the light guide plate 16, the surface facing the front side (surface facing the optical members 15) is a light emitting surface 16a that emits light from the interior toward the optical members 15 and the liquid crystal panel 11. Of the peripheral edge faces adjacent to the surface of the light guide plate 16, both edge faces of the light guide plate 16 in the longer side direction along the X axis (both edge faces of the respective edges in the shorter side direction) are light receiving faces 16b that directly face the respective LEDs 17 (LED substrates 18) with prescribed gaps therebetween and that receive light emitted from the LEDs 17. The light receiving faces 16b are on a plane parallel to that defined by the X axis direction and the Z axis direction (a surface of the LED substrate 18), and are substantially perpendicular to the light emitting surface 16a. The direction along which the LEDs 17 and the light receiving faces 16b are aligned with respect to each other is the same as the Y axis direction, and is parallel to the light emitting surface 16a. This light receiving face 16b faces the LEDs 17, and thus, can be said to constitute an "LED facing edge face (light source facing edge face)." On the other hand, of the peripheral edge faces adjacent to the surface of the light guide plate 16, both edge faces of the light guide plate 16 in the shorter side direction along the Y axis of the rectangular shape, are respectively LED non-facing edge faces (light source non-facing edge face) 16d that do not face the LEDs 17. The edge portion 16EP of the light guide plate 16 that has the LED non-facing edge face 16d, or in other words the edge portion 16EP in the shorter side direction, has a positional relationship such that the edge portion 16EP overlaps with the gate-side flexible substrate 28 when seen from the front.

As shown in FIGS. 4 and 5, a reflective sheet (reflective member) 20 is provided on the rear side of the light guide plate 16, or namely, on a surface 16c opposite to the light emitting surface 16a (the surface facing the chassis 14). This reflective sheet 20 covers almost the entire surface 16c and can reflect light that exits to the rear side back towards the front side. In other words, the light guide reflective sheet 20 is sandwiched between the chassis 14 and the light guide plate 16. The light guide reflective sheet 20 is made of a synthetic resin, and the surface thereof is a highly reflective white. As shown in FIG. 4, the light guide reflective sheet 20 is formed such that the shorter side dimension thereof is larger than that of the light guide plate 16, both edges of the light guide reflective sheet 20 being disposed so as to protrude further towards the LEDs 17 than the light receiving face 16b of the light guide plate 16. With the protruding portions (both edges in the longer side direction) of the light guide reflective sheet 20, light that travels diagonally from the LEDs 17 towards the chassis 14 can be reflected efficiently, thereby directing the light toward the light receiving faces 16b of the light guide plate 16. On at least one of the light emitting surface 16a and the opposite surface 16c opposite thereto in the light guide plate 16, a reflective part (not shown) that reflects internal light or a diffusion part (not shown) that diffuses internal light is patterned so as to have a prescribed distribution in the horizontal direction, thereby controlling the light emitted from the light emitting surface 16a to have an even distribution in the horizontal direction.

Next, the LEDs 17, LED substrate 18, and light source support member 19 that constitute the LED unit LU will be explained in that order. As shown in FIGS. 3 and 4, the LEDs 17 of the LED units LU have a configuration in which an LED chip is sealed with a resin on a substrate part that is affixed to the LED substrate 18. The LED chip mounted on the substrate part has one type of primary light emitting wavelength, and specifically, only emits blue light. On the other hand, the resin that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. Each of the LEDs 17 is of a so-called top-emitting type in which the side opposite to that mounted onto the LED substrate 18 (side facing the light-receiving face 16b of the light guide plate 16) is the primary light emitting surface.

As shown in FIGS. 3 and 4, the LED substrates 18 of the LED units LU are each formed in a narrow plate shape that extends along the longer side direction (X axis direction, longitudinal direction of the light receiving face 16b) of the light guide plate 16, and are housed between the frame 13 and the chassis 14 such that each surface thereof is parallel to the X axis direction and the Z axis direction, or in other words, in parallel with the light receiving faces 16b of the light guide plate 16 The length dimension of the LED substrate 18 is approximately half of the longer side dimension of the light guide plate 16. On the inner surfaces of the respective LED substrates 18, or in other words, on the surfaces facing the light guide plate 16 (surfaces opposing the light guide plate 16), the LEDs 17 having the above-mentioned configuration are mounted, and these surfaces are mounting surfaces 18a. On the mounting surfaces 18a of the LED substrates 18, a plurality of LEDs 17 are arranged in a row (in a line) along the length direction (X axis direction) at prescribed intervals. That is, a plurality of LEDs 17 are arranged at intervals along the longer side direction on the respective longer edges of the backlight device 12. The intervals between respective adjacent LEDs 17 along the X axis direction are substantially equal to each other, or in other words, the LEDs 17 are arranged at substantially the same pitch. The arrangement direction of the LEDs 17 corresponds to the length direction (X axis direction) of the LED substrates 18. Wiring patterns (not shown) made of a metal film (copper foil or the like) are formed on the mounting surface 18a of each of the LED substrates 18, and these wiring patterns extend along the X axis direction and go across the group of LEDs 17 to connect the adjacent LEDs 17 in series. Terminals formed at both respective edges of these wiring patterns connect to the power supply board PWB through a wiring member such as a connector or cable and supply driving power to each of the LEDs 17. Because the pair of LED substrates 18 disposed across the light guide plate 16 is housed between the frame 13 and the chassis 14 such that the respective mounting surfaces 18a for the LEDs 17 face each other, the primary light-emitting surfaces 17a of the respective LEDs 17 that are mounted on the respective LED substrates 18 of each pair face each other, and the optical axis of each LED 17 substantially coincides with the Y axis direction. The base member of the LED substrate 18 is made of a metal such as aluminum, for example, and the above-described wiring pattern (not shown) is formed on the surface via an insulating layer. The base material of the LED substrate 25 can alternatively be formed of an insulating material such as a ceramic.

As shown in FIGS. 3 and 4, the heat dissipating member 19 of the LED unit LU is made of a metal such as aluminum, for example, that has excellent heat conductivity. The heat dissipating member 19 is constituted of an LED attachment section (light source attachment section) 19a to which the LED substrate 18 is attached, and a heat dissipating section 19b that makes surface-to-surface contact with the plate surface of the chassis 14, and these two sections form a bent shape having a substantially L-shaped cross section. The length dimension of the heat-dissipating member 19 is substantially the same as the length dimension of the LED substrate 18. The LED attachment portion 19a of the heat-dissipating member 19 is in a plate shape that runs parallel to the surface of the LED substrate 18 and the light receiving face 16b of the light guide plate 16, and the longer side direction corresponds to the X axis direction, the shorter side direction corresponds to the Z axis direction, and the thickness direction corresponds to the Y axis direction, respectively. The inner surfaces of the LED attachment section 19a, namely the surfaces facing the light guide plate 16, have LED substrates 18 attached respectively thereto. While the longer side dimensions of the LED attachment section 19a are substantially similar to the longer side dimensions of the LED substrate 18, the shorter side dimensions of the LED attachment section 19a are greater than the shorter side dimensions of the LED substrate 18. The respective edges of the LED attachment section 19a in the shorter side direction protrude outward beyond the respective edges of the LED substrate 18 along the Z axis direction. The outer surface of an LED attachment portion 19a, that is, the surface opposite to the surface on which the LED substrate 18 is attached faces a first screw attaching section 21 of the frame 13, which will be later described. In other words, the LED attachment section 19a is disposed so as to be interposed between the first screw attaching section 21 of the frame 13 and the light guide plate 16. The LED attachment section 19a is configured to rise from the inner edge, or in other words, the edge closer to the LEDs 17 (light guide plate 16) of the heat-dissipating portion 19b described below toward the front side, or toward the frame 13 along the Z axis direction (direction in which the liquid crystal panel 11, the optical members 15, and the light guide plate 16 are layered).

As shown in FIGS. 3 and 4, the heat dissipating section 19b is formed in a plate shape that is parallel to the surface of the chassis 14, and the longer side direction corresponds to the X axis direction, the shorter side direction corresponds to the Y axis direction, and the thickness direction corresponds to the Z axis direction, respectively. The heat dissipating section 19b protrudes from the rear edge of the LED attachment section 19a, or in other words, from the edge closer to the chassis 14 towards the outside, or, in the direction opposite to the light guide plate 16. The longer side dimension of the heat-dissipating portion 19b is substantially the same as that of the LED attachment portion 19a. The rear surface of the heat dissipating section 19b, or in other words, the entire surface facing the chassis 14, makes surface-to-surface contact with the surface of the chassis 14. The front surface of the heat dissipating section 19b, or in other words, the surface opposite to the side that is in contact with the chassis 14, faces the first screw attaching section 21 of the frame 13, and is in contact with the protruding surface of the first screw attaching section 21. Thus, the heat dissipating section 19b is disposed so as to be sandwiched between the first screw attaching section 21 of the frame 13 and the chassis 14. As a result, heat generated by the LEDs 17 is transmitted towards the chassis 14 through the LED substrate 18, LED attachment section 19a, and heat dissipating section 19b, thereby effectively dissipating the heat to outside of the liquid crystal display device 10 through the frame 13 that has the chassis 14 and the first screw attaching section 21 and making it difficult for the heat to be trapped inside. This heat dissipating section 19b is affixed to the first screw attaching section 21 by a first screw (fastening member) SM1, the heat dissipating section 19b having an insertion hole 19b1 for allowing the first screw SM1 to pass through.

Next, the configurations of the frame 13 and the chassis 14 that constitute the exterior member and the holding member HM will be explained. The frame 13 and the chassis 14 are both made of a metal such as aluminum, for example, and have higher mechanical strength (rigidity) and heat conductivity compared to a case in which the frame 13 and the chassis 14 are made of a synthetic resin. Thus, the materials forming the frame 13 and the chassis 14 can be said to be light shielding materials with light shielding characteristics. As shown in FIG. 3, the frame 13 and the chassis 14 hold the liquid crystal panel 11, the optical members 15, and the light guide plate 16, which are stacked one on top of the other, by sandwiching these stacked components from the front side and the rear side, while housing the pair of LED units LU on the respective edges (respective longer side edges) in the shorter side direction.

As shown in FIG. 3, the frame 13 is formed in a horizontally-long frame shape as a whole so as to surround the display region on the display surface 11c of the liquid crystal panel 11. The frame 13 is constituted of a base wall 13a that is disposed in parallel with the display surface 11c of the liquid crystal panel 11 and that presses the liquid crystal panel 11 from the front side, and side walls 13b that protrude from the outer edges of the panel pressing portion 13a toward the rear side, and the frame 13 has a substantially L-shaped cross portion. The base wall 13a is formed in a horizontally-long frame shape as in the outer edge portion (non-display region, frame portion) of the liquid crystal panel 11. The base wall 13a is made wide enough to cover the optical member 15 and the outer edges of the light guide plate 16 that are located outside of the respective longer sides of the liquid crystal panel 11 in the radial direction, and the respective LED units LU from the front side, in addition to the outer edges of the liquid crystal panel 11. The front outer surface of the base wall 13a (surface opposite to the side facing the liquid crystal panel 11) is exposed to the outside on the front side of the liquid crystal display device 10 as in the display surface 11c of the liquid crystal panel 11, and constitutes the front side of the liquid crystal display device 10 together with the display surface 11c of the liquid crystal panel 11. On the other hand, the side walls 13b take the form of a substantially angular enclosure that protrudes from the outer edges of the base wall 13a toward the rear side. The side walls 13b can enclose the liquid crystal panel 11, the optical members 15, the light guide plate 16, and the LED units LU that are housed therein along almost the entire periphery thereof, and also can enclose the chassis 14 on the rear side along almost the entire periphery thereof. The outer surfaces of the side walls 13b along the circumferential direction of the liquid crystal display device 10 are exposed to the outside in the circumferential direction of the liquid crystal display device 10, and constitute the top face, the bottom face, and the side faces of the liquid crystal display device 10.

Figure 8:
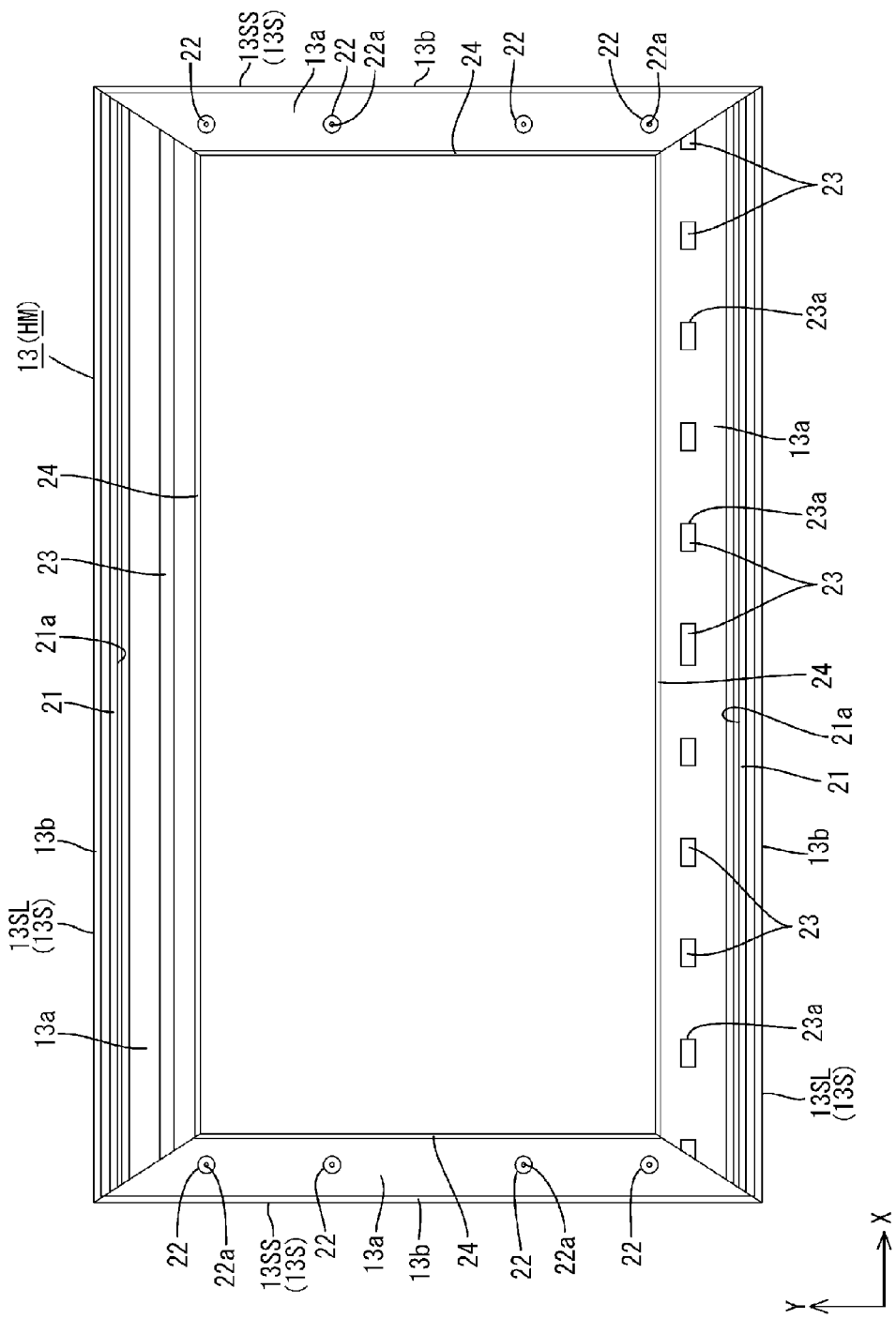
FIG. 8 is a rear view of the frame

As shown in FIG. 8, the frame-shaped frame 13 that has the basic configuration mentioned above is configured by assembling four segmented frames 13S that are separated at the respective sides (respective longer side portions and shorter side portions). Specifically, the segmented frames 13S include a pair of longer side segmented frames 13SL that forms the respective longer side portions of the frame 13 (base wall 13a and side walls 13b) and a pair of shorter side segmented frames 13SS. The longer side segmented frame 13SL is formed of a prismatic member that is a substantially L-shaped cross section that extends along the X axis direction, but the shorter side segmented frame 13SS is a prismatic member that is a substantially L-shaped cross section that extends along the Y axis direction. Due to this, the manufacturing cost can be reduced if it is possible to adopt a manufacturing method in which each segmented frame 13S is manufactured by extrusion of a metal compared to manufacturing the frame 13 by machining a metal. The longer side segmented frames 13SL and the shorter side segmented frames 13SS constitute the frame 13 by being connected at respective edges in the respective extending direction of each segmented frame. As shown in FIG. 8, each edge that is a connecting portion (seam of the frame 13) of the longer side segmented frame 13SL and the shorter side segmented frame 13SS is inclined with respect to both X axis direction and Y axis direction in a plan view. Specifically, it is in a shape that corresponds to the straight line that connects the inner edge position and the outer edge position of the respective corner portions of the base wall 13a. Furthermore, because the longer side segmented frames 13SL cover the respective LED unit LU (see FIG. 6) in addition to the liquid crystal panel 11, the optical members 15, and the light guide plate 16, the longer side segmented frames 13SL are formed wider compared to the shorter side segmented frames 13SS (see FIG. 10) that do not cover the LED unit LU.

As shown in FIGS. 4 and 5, screw attaching sections (fastening member attaching sections) 21 and 22 where screws (fastening members) SM1 and SM2 that fix the frame 13 and the chassis 14 together are attached are integrally formed at locations further towards the inside (towards the light guide plate 16) than the side wall 13b of the base wall 13a. The screw attaching sections 21 and 22 include a first screw attaching section (first fastening member attaching section, light source side first fastening member attaching section) 21 that is provided on a portion of respective longer side portions that overlap with the LED unit LU (LED 17) of the base wall 13a in a plan view, and a second screw attaching section (second fastening member attaching section, non-light source side fastening member attaching section) 22 that is that is provided on a portion of respective shorter side portions that do not overlap with the LED unit LU (LED 17) of the base wall 13a in a plan view. Here, the first screw attaching section 21 on the longer side (side where LED unit LU (light source) is located) will be described first and the second screw attaching section 22 on the shorter side (side where LED unit LU (light source) is located) will be described later.

As shown in FIG. 4, the first screw attaching sections 21 are provided so as to be paired with a pair of longer side portions of the base wall 13a. Specifically, the first screw attaching section 21 is in a substantially block shape that protrudes towards the rear side along the Z axis direction of the inner surfaces of the respective longer side portion of the base wall 13a, the first screw attaching section 21 extending along the respective longer sides of the base wall 13a. The first screw attaching section 21 has the same length as the entire length of each longer side length of the base wall 13a. As shown in FIG. 8, the first screw attaching section 21 is provided on a respective longer side separated frame 13SL that forms the frame 13. As shown in FIG. 4, each first screw attaching section 21 has a screw fastening groove (fastening member fastening groove) 21a that has an opening facing the rear side and can fasten the first screw SM1. The screw fastening groove 21a is formed along approximately the entire length of the first screw attaching section 21 in the lengthwise direction, the width being slightly smaller than the shaft portion of the first screw SM1. The first screw attaching section 21 is disposed so as to be between the base wall 13a of the frame 13 and the chassis 14 in the Z axis direction.

Figure 6:
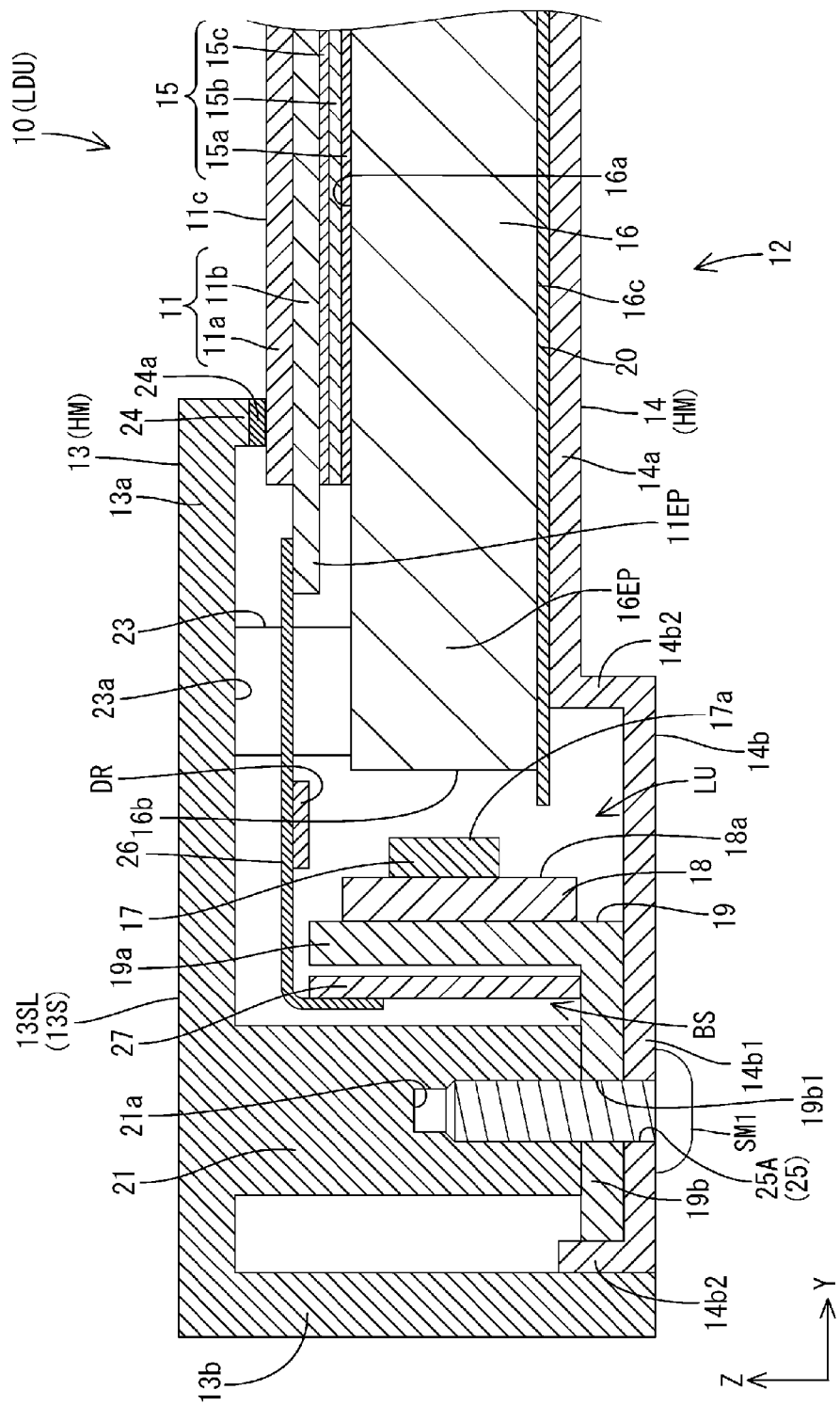
FIG. 6 is an enlarged cross-sectional view showing a cross-sectional configuration of the liquid crystal display device along the shorter side direction, the cross-section cutting across a flexible substrate (insertion holes for jointly fastening a plurality of parts).
Figure 7:
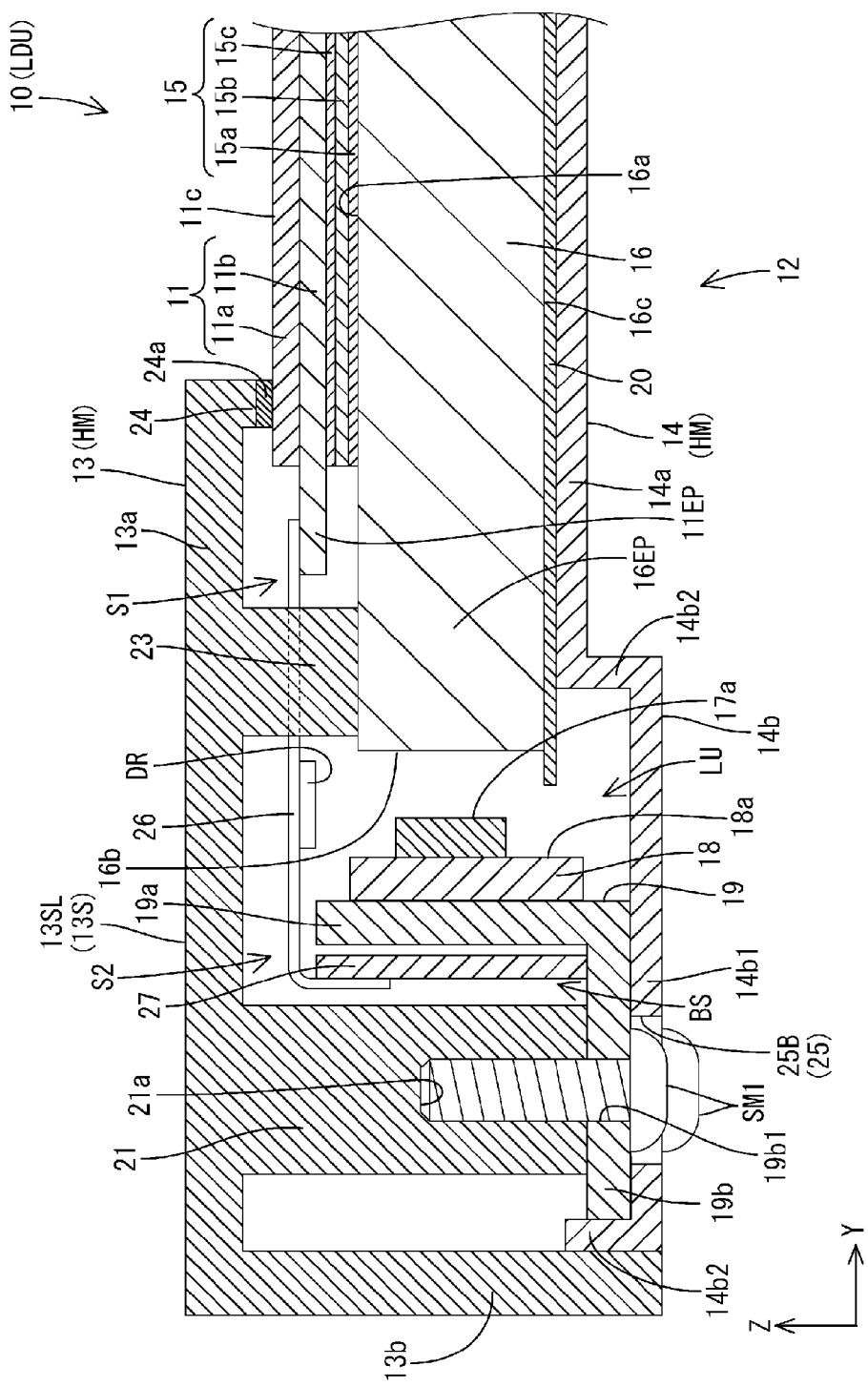
FIG. 7 is an enlarged cross-sectional view showing a cross-sectional configuration of the liquid crystal display device along the shorter side direction, the cross-section cutting across a light guide plate supporting member (insertion holes for the heat dissipating member).

As shown in FIG. 4, each first screw attaching section 21 is disposed between respective side walls 13b of the frame 13 and respective heat dissipating members 19 forming the LUD unit LU, the respective first screw attaching sections 21 and the LED attaching sections 19a having a prescribed gap therebetween. Furthermore, as shown in FIGS. 6 and 7, among the pair of heat dissipating members 19, there is a substrate housing space BS in which a printed board 27 can be housed between the heat dissipating member that is in a position that overlaps with the source-side flexible substrate 26 in a plan view and the first screw attaching section 21 where the heat dissipating member is attached. In other words, the printed board 27 is formed between the first screw attaching section 21 and the LED attachment section 19a. The printed board 27 is a synthetic resin with a horizontally long plate shape extending along the lengthwise direction (X axis direction) of the first screw attaching section 21 and the LED attachment section 19a, the surface being parallel to the outer side (side opposite to the LED substrate 18 side) of the LED attachment section 19a. In other words, the printed board 27 is housed in the substrate housing space BS in a position in which the longer side direction matches the X axis direction, the shorter side direction matches the Z axis direction, and the thickness direction matches the Y axis direction. On the printed board 27, a plurality of flexible substrates 26 are arranged at intervals along the longer side direction thereof, and ends on the other side (side opposite to the liquid crystal panel 11 side) of the flexible substrates 26 are respectively connected to the printed board 27. The flexible substrates 26 that are connected to the source side printed board 27 and the array substrate 11b of the liquid crystal panel 11 bridge over the LED attachment portion 19a, the LED substrate 18, and the LEDs 17 along the Y axis direction. The printed board 27 also has a connector to which one end of the FPC is inserted and connected (neither the connector nor the FPC is shown in the figures), and the other end of the FPC is drawn to the outside on the rear side of the chassis 14 through an FPC insertion hole (not shown) formed in the chassis 14, and is connected to the control board CTB.

As shown in FIG. 4, within the respective longer side portions of the base wall 13a, there are light guide plate supporting members 23 integrally formed so as to oppose each other in a position further inside than the first screw attaching section 21, the light guide plate supporting members 23 supporting the light guide plate 16 from the front side (display surface 11c side). The light guide plate support member 23 protrudes towards the rear side (light guide plate 16) along the Z axis direction (protruding direction of the first screw attaching section 21) from the inner surface of each longer side portion of the base wall 13a, and is formed in a long and narrow substantially block shape that extends along each longer side (X axis direction) of the base wall 13a. The light guide plate supporting members 23 has the same length as each longer side of the base wall 13a. As shown in FIG. 8, the light guide plate supporting member 23 is provided so as to oppose a pair of longer side separated frames 13SL of the frame 13, in a manner similar to the first screw attaching portion 21 above. As shown in FIG. 4, the light guide plate supporting members 23 are disposed so as to overlap the edge portion 16EP of the longer side of the light guide plate 16 that protrudes farther outward than the liquid crystal panel 11 in a plan view (when seen from the display surface 11c side), a protrusion edge face of the light guide plate 16 being in contact with the front side surface of the edge portion 16EP in the longer side of the light guide plate 16; in other words, the light guide plate supporting members 23 are in contact with the light exiting surface 16a. Therefore, the light guide plate supporting member 23 can support the light guide plate 16 by sandwiching the light guide plate 16 with the chassis 14 from the front side (light exiting side), which will be described below, and has the light guide plate supporting function. The light guide plate 16 is pressed by each light guide plate supporting member 23 from the front side over substantially the entire length of both edge portions 16EP of the light guide plate 16. Both edge portions 16EP of the light guide plate 16 where the light guide plate supporting members 23 are in contact, are edge portions that has a light receiving face 16b (LED opposing edge surface) opposing the LED 17, the light guide plate supporting members 23 supporting the light guide plate 16 making it possible to achieve a stable positional relationship between the LED 17 and the light receiving face 16b in the Z axis direction.

As shown in FIG. 4, each light guide plate supporting member 23 is disposed between the liquid crystal panel 11 and the LEDs 17. Specifically, each light guide plate supporting member 23 closes off a space between the respective end faces of the LED 17 side of the optical members 15 and the liquid crystal panel 11, and by doing so the light from the LEDs 17 is blocked from directly entering the end faces of the liquid crystal panel 11 and the light guide plate 15 without passing the light guide plate 16, each light guide plate supporting members 23 having a light shielding function, and thus functioning as a "light shielding portion." Furthermore, a side face facing the inner side of each light guide plate 23 can be attached to the end faces of the edge portion 11EP in the longer side of the liquid crystal panel 11. Due to this, the position of the liquid crystal panel 11 in the Y axis direction can be fixed when the liquid crystal panel 11 is assembled to the frame 13. As shown in FIGS. 6 and 7, among the respective light guide plate supporting members 23, the source-side flexible substrate inserting grooves 23a for inserting the source-side flexible substrate 26 are formed at intervals along the X axis direction by cutting out corresponding portions thereof. The arrangement of the passages matches the arrangement of the respective source-side flexible substrates 26.

As shown in FIG. 3, the chassis 14 is formed in a substantially shallow plate shape that is horizontally long as a whole so as to almost entirely cover the light guide plate 16, the LED units LU, and the like from the rear side. The rear outer surface of the chassis 14 (surface opposite to the side facing the light guide plate 16 and the LED units LU) is exposed to the outside on the rear side of the liquid crystal display device 10, and constitutes the rear surface of the liquid crystal display device 10. The chassis 14 is constituted of a bottom plate 14a formed in a horizontally-long quadrangular shape in a similar manner to the light guide plate 16, and a pair of LED housing portions (light source housing portions) 14b that protrude from the respective longer side edges of the bottom plate 14a toward the rear side in a step-like shape and that house the LED units LU, respectively.

As shown in FIGS. 3 and 4, the bottom plate 14a is formed in a flat sheet shape that can receive the rear side of a large center portion (which does not include the respective longer side edges) of the light guide plate 16, or in other words, the bottom plate 14a constitutes a receiving portion for the light guide plate 16. As shown in FIG. 5, the respective shorter side edges of the bottom plate 14a that does not overlap with the LED unit LU (LED 17) in a plan view is a pair of a second screw mounting section (second fastening member mounting section, non-light source side fastening member attaching section) 14a1 that is attached to the second screw (second fastening member) SM2 from outside to affix the frame 13 and the chassis 14 to each other. Furthermore, the configuration of the second screw mounting section will be described later along with the second screw attaching section 22.

As shown in FIGS. 3 and 4, the LED housing portions 14b are disposed at the respective sides of the bottom plate 14a in the shorter side direction, and can house the LED units LU therein by being recessed toward the rear side from the bottom plate 14a. The LED housing portion 14b overlaps the LED unit LU (LED17) in a plan view, the LED housing portion 14b including a first screw mounting portion (first fastening member mounting section, light source side fastening member mounting section) in parallel with the bottom portion 14a where the first screw SM1 is mounted from outside, and a pair of side plates 14b2 that rise from the respective ends of the first screw mounting section 14b1 towards the front side, the side plate 14b2 towards the inner side out of the pair of side plates 14b2 being connected to the bottom portion 14a. The heat dissipating section 19b of the heat dissipating member 19 included in the LED unit LU is disposed so as to make face-to-face contact with the inner surface of the first screw mounting section 14b1 of the LED housing portion 14b. Furthermore, the side plate 14b2 of the LED housing portion 14b has the function of fixing the position of the chassis 14 to the frame 13 in the Y axis direction by being inserted into the gap between the first screw attaching section 21 in the longer side direction and the side wall 13b.

As shown in FIGS. 6 and 7, a pair of first screw mounting portions 14b1 of the LED housing portion 14b each has a plurality of the first screw hole 25 where the first screw SM1 passes. The respective first screw mounting sections 14b1 are arranged so as to overlap the first screw attaching sections 21 of the frame 13 in a plan view. The respective first screw holes 25 formed in the first screw mounting sections 14b1 are continuous with the screw fastening groove 21a of the first screw attaching section 21. Thus, the first screw SM1 passes through the first screw hole 25 along the Z axis direction (the direction in which the liquid crystal panel 11, optical member 15, and the light guide plate 16 are layered) from the rear side (opposite side to the display surface 11c side) of the chassis 14, the first screw SM1 being configured to be fastened to the screw fastening groove 21a of the first screw attachment section 21 while holding in place the first screw mounting section 14b1. When the first screw SM1 is fastened, a screw groove is formed on the screw fastening groove 21a by a screw thread that is formed on the shaft portion of the first screw SM1. As shown in FIG. 6, the first screw holes 25 formed in the respective first screw mounting sections 14b1 have a fastening screw hole 25A that allows only the shaft portion of the first screw SM1 to pass, and also has a screw hole for the heat dissipating member 25B that allows the head portion along with the shaft portion of the screw to pass, the first screw SM1 that is inserted into the former hole attaching the heat dissipating section 19b and the housing bottom plate 14b1 to the first screw attaching section 21, the first screw member SM1 passing through the latter hole functioning to attach only the heat dissipating section 19b to the first screw attaching section 21.

As shown in FIGS. 4 and 5, the base wall 13a that forms the frame 13 has a panel pressing portion 24 that presses the liquid crystal panel 11 from the front side. The panel pressing member 24 has a substantially frame shape in a plan view by being disposed on an inner edge location (inner edge part) of the base wall 13a and extending throughout the entire periphery thereof. The panel pressing member 24 has a substantially block shape in a cross-sectional view, and is integrally formed with the base wall 13a at the rear side of the inner edge location, or in other words, is integrally formed in a shape extending along the Z axis towards the liquid crystal panel 11. The panel pressing member 24 has a cushioning material 24a attached to the protruding edge face thereof, the panel pressing portion 24 being able to press the liquid crystal panel 11 from the front side through the cushioning material 24a. The cushioning material 24a is preferably formed of an elastic material such as rubber, resin, or the like, and is made of PORON (registered trademark) that uses foam urethane as a raw material, for example. As shown in FIG. 8, this panel pressing member 24 and cushioning material 24a are separated in accords with each side of the respective separated frames 13S forming the frame 13 and extend along each side thereof. Once the respective separated frames 13S are assembled, as a whole, the panel pressing portion 23 and the cushioning material 24a have substantially frame shapes that are disposed throughout the entire periphery of the inner edge part of the base wall.

Here, among fixing structures that fix together the frame 13 and the chassis 14, the fixing structure that is disposed on the shorter side of the frame 13 and the chassis 14 (non-disposing side of the LED unit LU (light source)) and the positional relationship between this fixing structure and the panel pressing portion 24 will be described in detail. As shown in FIG. 5, this fixing structure on the shorter side has the second screw attaching section 22 provided on the frame 13, the second screw mounting section provided on the chassis 14, and the second screw SM2 that is attached to the second screw attaching section 22 while sandwiching the second screw mounting section 14a1. The edge portion 16EP on the shorter side of the light guide plate 16 has the hole 29 where the second screw attaching section 22 is inserted. Furthermore, the fixing structure disposed on the longer side (side where LED unit LU (light source) is disposed) of the frame 13 and the chassis 14, as mentioned before, has a first screw attaching section 21 provided on the frame 13, the first screw mounting section 14b1 provided on the chassis 14, and the first screw SM1 that is attached to the first screw attaching section 21 while holding in place the first screw mounting section 14b1 Below, the fixing structure on the shorter side and the structure of the hole 29 will be described in detail.

Figure 11:
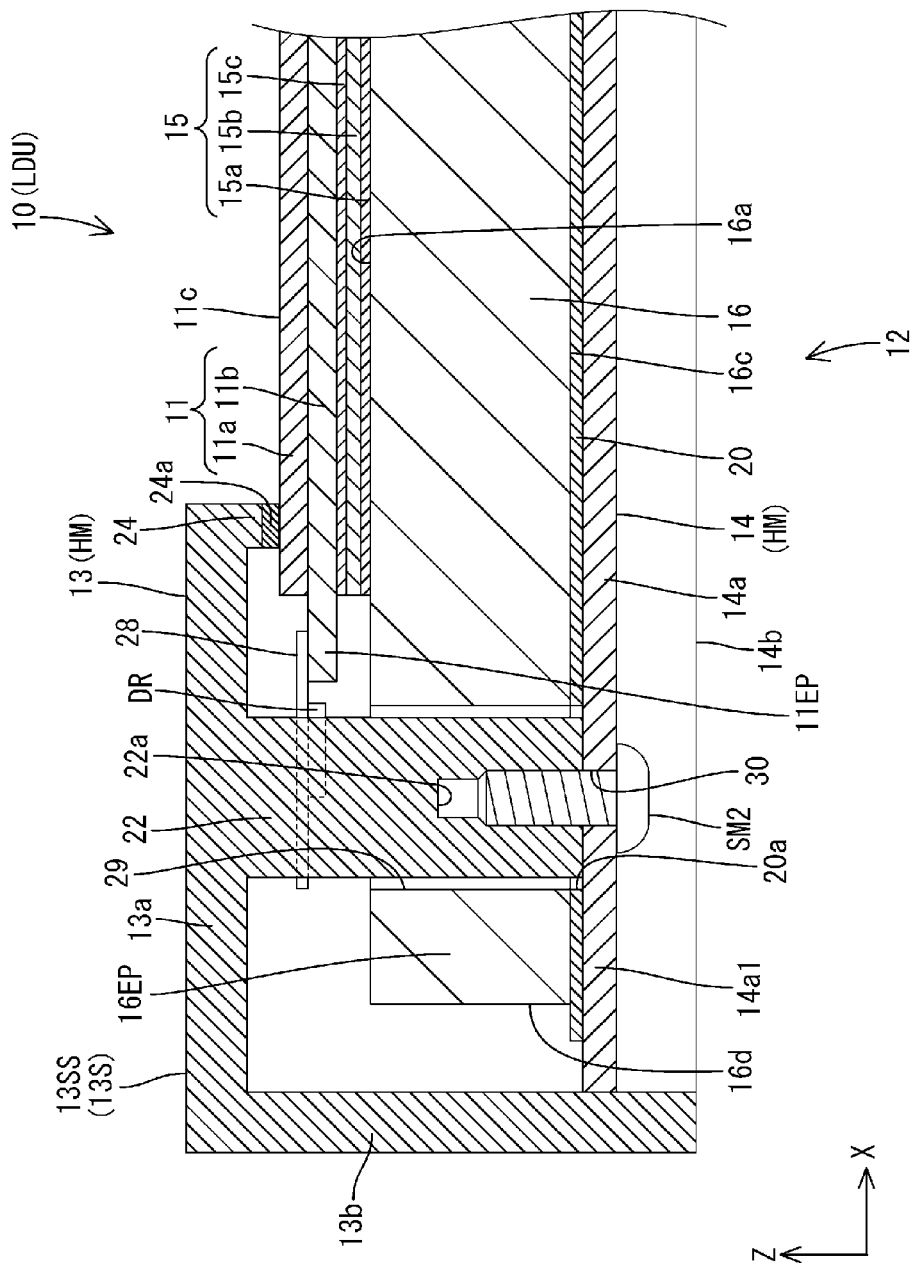
FIG. 11 is a cross-sectional view of FIG. 10 along the line xi-xi.

As shown in FIGS. 8 and 11, the second screw attaching sections 22 are disposed on the outer edges of each shorter side of the base wall 13a of the frame 13, and are sandwiched (interposed) between the panel pressing members 24. The second screw attaching sections 22 protrude towards the rear side along the Z axis direction from the inner surface of each shorter side portions, the second screw attaching sections 22 having a substantially cylindrical shape that is almost a perfect circle in a plan view. In other words, the first screw attaching section 21 mentioned before has a substantially linear shape in a plan view, but the second screw attaching section 22 has a substantially dot shape in a plan view. The second screw attaching sections 22 are respectively provided on a pair of shorter side segmented frames 13SS that constitute the frame 13. The second screw attaching section 22 has a screw fastening hole (fastening member fastening hole) 22a that has an opening facing the rear side and that can fasten the screw SM. The screw fastening hole 22a is provided in the second screw attaching section 22 so as to be concentric with the second screw attaching section 22, and the size of the screw fastening hole 22a is slightly smaller than the shaft portion of the second screw SM2. The second screw attaching sections 22 are disposed between the base wall 13a of the frame 13 and the chassis 14 in the Z axis direction.

Figure 12:
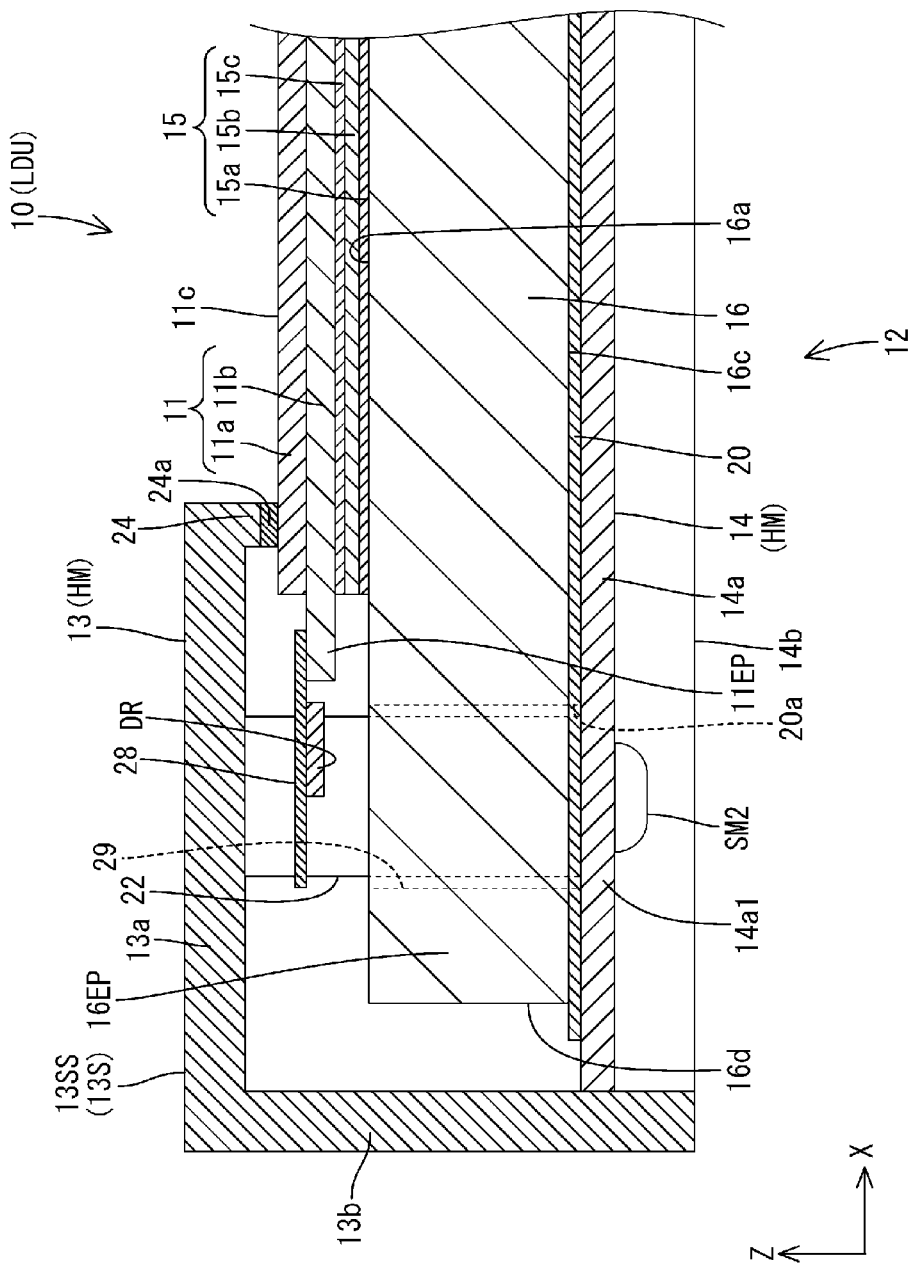
FIG. 12 is a cross-sectional view of FIG. 10 along the line xi-xi.

As shown in FIG. 8, the second screw attaching sections 22 are disposed towards the outside of the edge faces of the edge portions 11EP of each shorter side of the liquid crystal panel 11 so as to be adjacent to each other, and the second screw attaching sections 22 are aligned in intervals of four in the direction along the edge face on the edge face side thereof. A side face of the respective second screw attaching sections 22 facing the inner side can be attached to the edge face of the edge portion 11EP in the shorter side of the liquid crystal panel 11, and thus, the position of the liquid crystal panel 11 can be fixed in the X axis direction when the liquid crystal panel 11 is assembled to the frame 13. Furthermore, the respective second screw attaching sections 22 have a protrusion with a size large enough to contact the chassis 14 penetrating the hole 29 of the light guide plate 16, and thus, the edge portion 11EP of the liquid crystal panel 11 can come into contact more reliably. Four second screw attaching sections 22 are arranged on each shorter side portion of the base wall 13a with the same interval, and are in symmetry. Among the four second screw attaching sections 22 that are aligned along the Y axis direction, two second screw attaching sections 22 that are arranged on two edges are arranged near the corners of the frame 13 and the chassis 14. As shown in FIGS. 11 and 12, among the pair of shorter side portions of the base wall 13a, the second screw attaching section 22 that is disposed on the shorter side portion that overlaps the gate-side flexible substrate 28 in a plan view, the shorter side portion being disposed adjacent to the gate-side flexible substrate 28 in the Y direction, the gate-flexible substrate being disposed so as to protrude outwards along the X axis direction from the edge portion 11EP on the shorter side of the liquid crystal panel 11. In other words, the second screw attaching section 22 and the gate-side flexible substrate 28 have a positional relationship such that the two are aligned along the Y axis direction and overlap each other in the X axis direction. A plurality of the second screw attaching sections 22 and a plurality of the gate-side flexible substrates 28 are aligned alternately along the Y axis direction, the gate-side flexible substrate 28 being interposed between two second screw attaching sections that are adjacent to each other in the Y axis direction.

Figure 9:
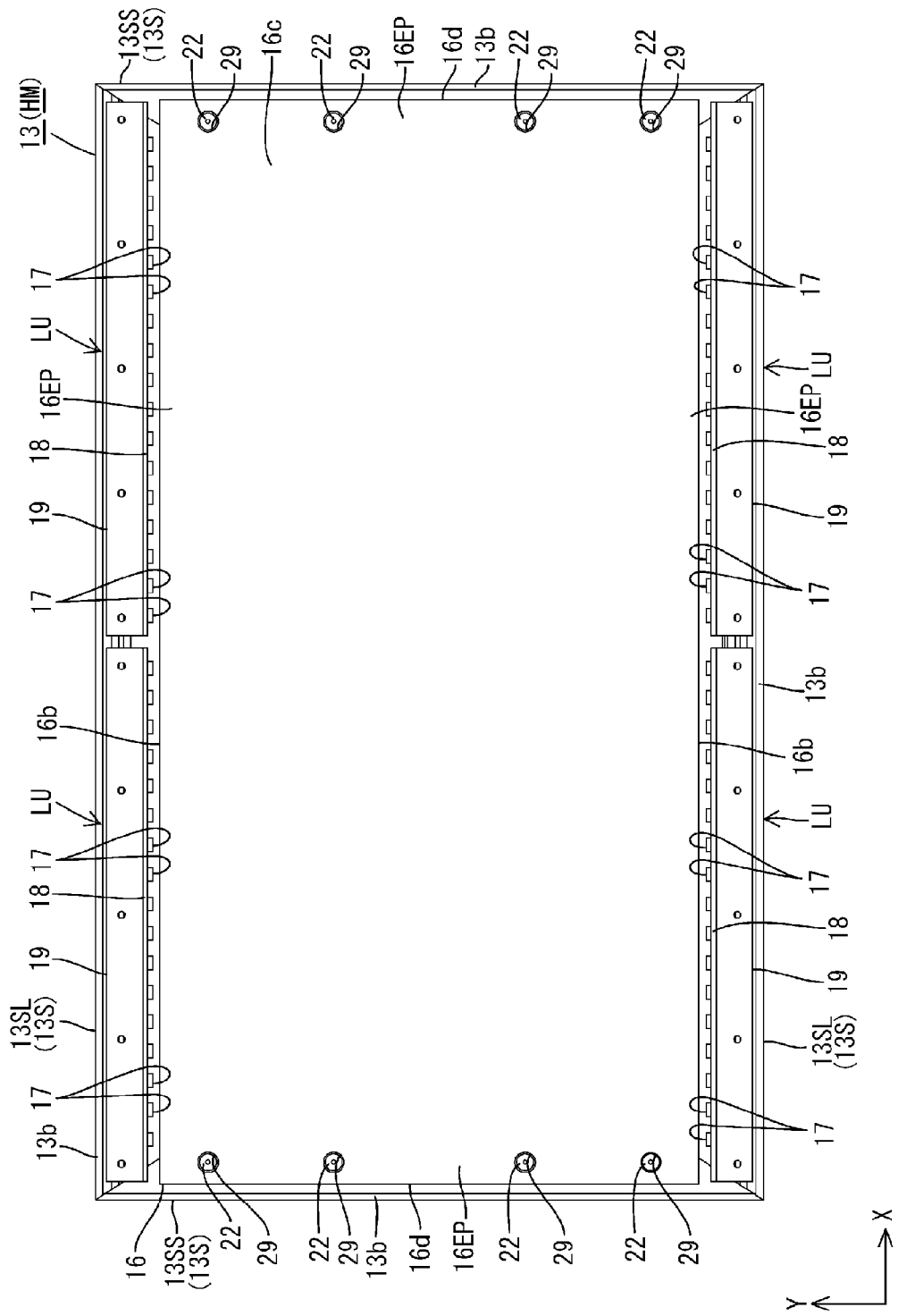
FIG. 9 is a rear view of the frame when an LED unit, a light guide plate, and the like are assembled to the frame.

As shown in FIGS. 9 and 11, the respective second screw attaching sections 22 with the configuration mentioned above are arranged in locations that overlap a pair of edge portions 16EP on the shorter sides of the light guide plate 16 in a plan view. Furthermore, holes 29 that allow the second screw attaching sections 22 to be inserted are formed on the edge portions 16EP on the respective shorter sides of the light guide plate 16. Thus, compared to when second screw attaching sections (second screws) that are fastening structures are disposed farther towards the outside compared to the edge portions 16EP in the shorter side of the light guide plate 16, the second screw attaching sections 22 (second screws SM2) can be said to be disposed relatively closer to the panel pressing portion 24. Moreover, the respective second screw attaching sections 22 are arranged so that the second screw attaching sections 22 are adjacent to and can contact the edge portions 11EP on the shorter side of the liquid crystal panel 11. These mean that the frame 13 is fixed to the chassis 14 closer to the panel pressing portion 24 that presses the liquid crystal panel 11 from the front side. On the base wall 13a of the frame 13, there are many cases in which the base wall 13a becomes deformed due to warping, bending, and the like, the deformation originating in the fastened location (second screw attaching section 22) of the chassis 14. By having the panel pressing member 24 at a location closer to the originating point of the deformation that can occur to the base wall 13a, the portion of the base wall 13a between the second screw attaching section 22 and the panel pressing member 24 is less prone to deformations such as warping and bending. As a result, the panel pressing member 24 (cushioning material 24a) is less likely to move along the Z axis direction towards the front side while contacting the liquid panel pressing member 11; in other words, the liquid crystal panel 11 is less likely to deform in a direction away from the liquid crystal panel 11, and thus, it is less likely that a gap is formed with the liquid crystal panel 11. Thus, light leakage from a gap that can be formed between the panel pressing member 24 and the liquid crystal panel 11 is prevented from taking place.

As shown in FIGS. 9 and 11, the hole 29 can be attached to the outer surface of the second screw attaching section 22, and as a result, the position of the light guide plate 16 can be fixed in a direction along the surface of the second screw attaching portion 22. The hole 29 has a hole shape that is almost a perfect circle in a plan view penetrates the light guide plate 16 along the plate thickness direction (Z axis direction). The diameter of the hole 29 is slightly larger than the diameter of the second screw attaching section 22, which allows the second screw attaching section 22 to be inserted smoothly and allows the thermal expansion and contraction of the light guide plate 16. This hole 29 penetrates the light guide plate 16 in the plate thickness direction and there is a risk that light transmitted within the light guide plate 16 leaks through the inner surface of the hole 29, but the hole portion 29 is formed on the edge portion 16EP on the shorter side of the LED non-facing edge face 16d of the light guide plate 16, making light leakage less likely. The inner surface of the hole 29 is in a circular shape without an edge and faces the second screw attaching portion 22 that is inserted throughout the entire periphery. In other words, the hole 29 is formed in the light guide plate 16 as an insertion hole that does not open towards the outside in the direction (X axis direction and Y axis direction) along the surface of the light guide plate 16. Therefore, when the second screw attaching section 22 is inserted into the hole 29, the opposing peripheral surfaces come into contact with each other, and thus, the position of the light guide plate 16 is fixed along the surfaces in every direction. The holes 29 are disposed in the edge portions 16EP of each shorter side of the light guide plate 16 and are aligned in intervals of fours along the direction of the arrangement of the respective second screw attaching section 22 in the Y axis direction. Among the four holes 29 that are aligned along the Y axis direction, two holes 29 that are formed on the two edges are arranged around the corners of the light guide plate 16. Meanwhile, on the light guide reflective sheet 20 interposed between the light guide plate 16 and the bottom plate 14a of the chassis 14, connecting holes 20a that connect with the respective holes 29 are formed, the connecting holes 20a having the second screw attaching section 22 inserted therein in a similar manner to the holes 29. In other words, the position of the light guide plate 20 is fixed by the second screw attaching sections 22 in a manner similar to the light guide plate 16.

As shown in FIG. 11, the second screw attaching section 22 that is inserted into the holes 29 and the connecting holes 20a with the above-mentioned structures comes into contact with the second screw mounting sections 14a1 on the edge portions in the shorter side of the bottom plate 14a of the chassis 14 that does not overlap with the LED unit LU (LEDs 17). The respective second screw mounting sections 14a1 are arranged so as to overlap the second screw attaching sections 22 of the frame 13 in a plan view. The second screw holes 30 through which the second screws SM2 pass are formed on the second screw mounting sections 14a1. The second screw holes 30 are aligned on the respective screw mounting sections 14a1 in intervals of fours along the direction of the arrangement of the respective second screw attaching sections 22 and the respective holes 29 in the Y axis direction. The second screw holes 30 are continuous with the screw fastening holes 22a of the second screw attaching sections 22. Thus, the second screw SM2 passes through the second screw hole 30 along the Z axis direction (the direction in which the liquid crystal panel 11, optical member 15, and the light guide plate 16 are layered) from the rear side (opposite side to the display surface 11c side) of the chassis 14, the first screw SM2 being configured to be fastened to the screw fastening groove 22a of the first screw attachment section 22 while sandwiching the first screw mounting section 14a1. When the second screw SM2 is fastened, a screw groove is formed on the screw fastening groove 22a by a screw thread that is formed on the shaft portion of the second screw SM2.

As shown in FIG. 11, the fastening direction (Z axis direction) of the second screw SM2 matches the overlapping direction of the optical member 15 and the light guide plate 15, the frame 13 and chassis 14 having enough holding strength to sandwich and hold from the front and rear the liquid crystal panel 11, the optical members 15 and the light guide plate 16 that are layered. As a result, the liquid crystal panel 11, the optical members 14, and the light guide plate 16 can be held in close contact and a gap is less likely to form between the panel pressing member 24 and the liquid crystal panel 11. As the layered liquid crystal panel 11, the optical members 15 and the light guide plate 16 have been kept in close contact without any gaps between, the light that is supplied from the light guide plate 16 through the optical members 15 to the liquid crystal panel 11 reduces the likelihood of the respective members 11, 15, and 16 from having unevenness on the surfaces, and therefore improving the display quality of images displayed on the liquid crystal panel 11. The fixing structures in the longer side of the frame 13 and the chassis 14 are similar to the fixing structures in the shorter side in that the fastening direction of the first screw SM1 matches in the Z axis direction and the liquid crystal panel 11, the optical members 15, and the light guide plate 16 are held between the frame 13 and the chassis 14 with strong holding strength along the entire periphery, and have reduced likelihood of having uneven brightness and have excellent display quality.

Figure 10:
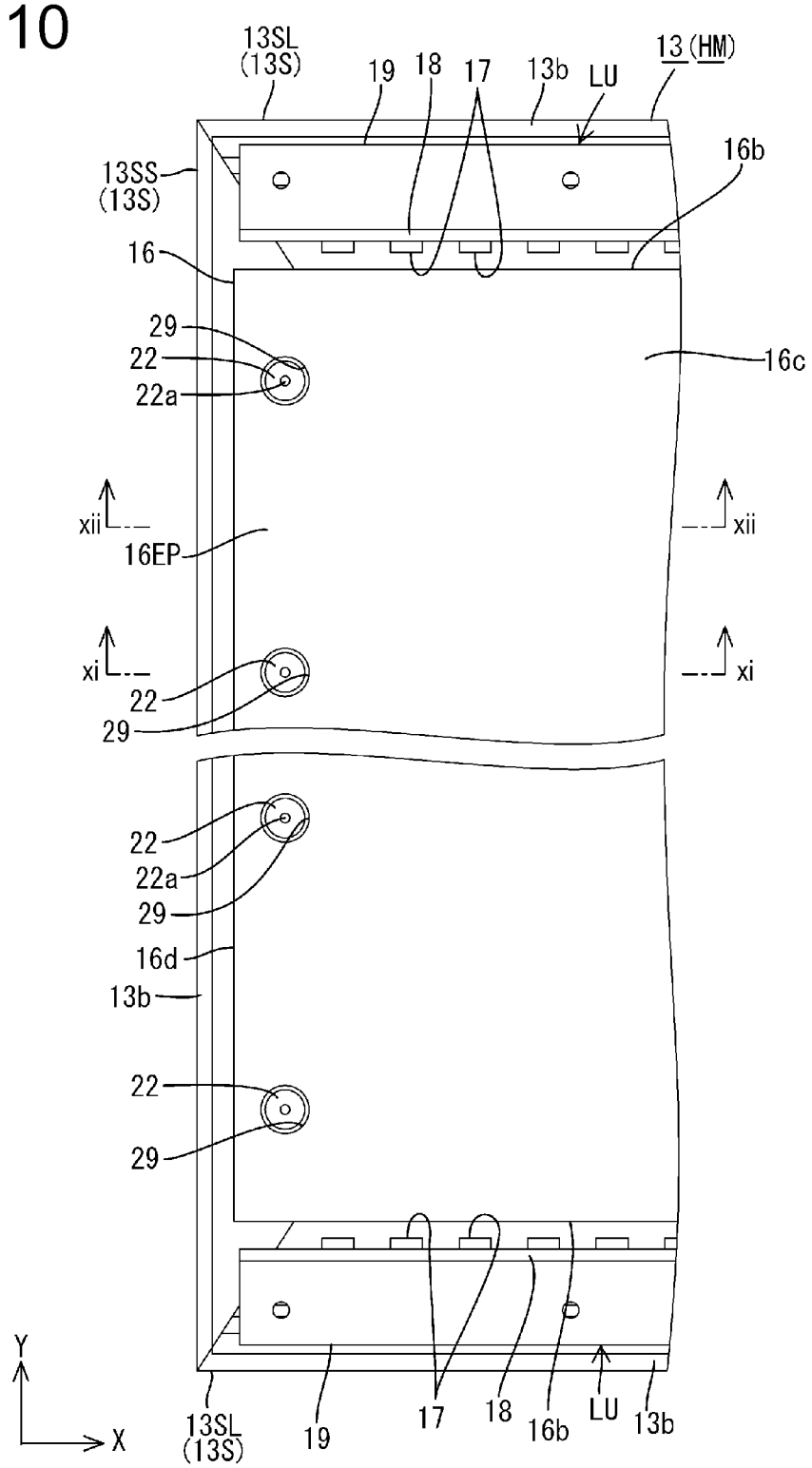
FIG. 10 is an enlarged view of the rear view of the frame when an LED unit, a light guide plate, and the like are assembled to the frame.

As shown in FIGS. 10 and 11, the second screw attaching sections 22 that are fixing structures in the shorter side of the frame 13 and the chassis 14 are arranged so as to overlap with the edge portions 16EP of the light guide plate 16; by inserting the second screw attaching sections 22 into the holes formed thereof, the position of the light guide plate 16 can be fixed. In other words, the second screw attaching sections 22 doubles as the fixing structure of the frame 13 and the chassis 14 and the structure for fixing in position the light guide plate 16. If the fixing structure of the frame and the chassis, and the position defining structure of the light guide plate is provided separately, the fixing structure would at least be disposed farther towards the outside than the edge portion of the light guide plate, and thus a space for the fixing structure must be provided towards the outside of the light guide plate. In the present embodiment, it is possible to achieve a narrower frame because the fixing structure of the frame 13 and the chassis 14 and the position defining structure of the light guide plate 16 are the same, and thus a space for the fixing structure does not need to be provided towards the outside of the light guide plate 16, and therefore the frame portion around the periphery of the liquid crystal display device 10 can be narrower. Furthermore, in the present embodiment, the frame 13 and the chassis 14 are fixed firmly by adopting a fixing structure that has respective screws SM1 and SM2 that are screwed in the direction in which the liquid crystal panel 11, the optical members 15, and the light guide plate 16 are layered; as a result, for reasons such as obtaining enough mechanical strength for the respective screw attaching sections 21 and 22, the fixing structure uses more space than other fixing structures (a structure that has a screw that is fastened from a side of the frame and the chassis along the X axis direction or the Y axis direction), and thus, the structure is better suited to achieving a narrower frame by providing the fixing structure so as to overlap the light guide plate 16 in a plan view.

Figure 13:
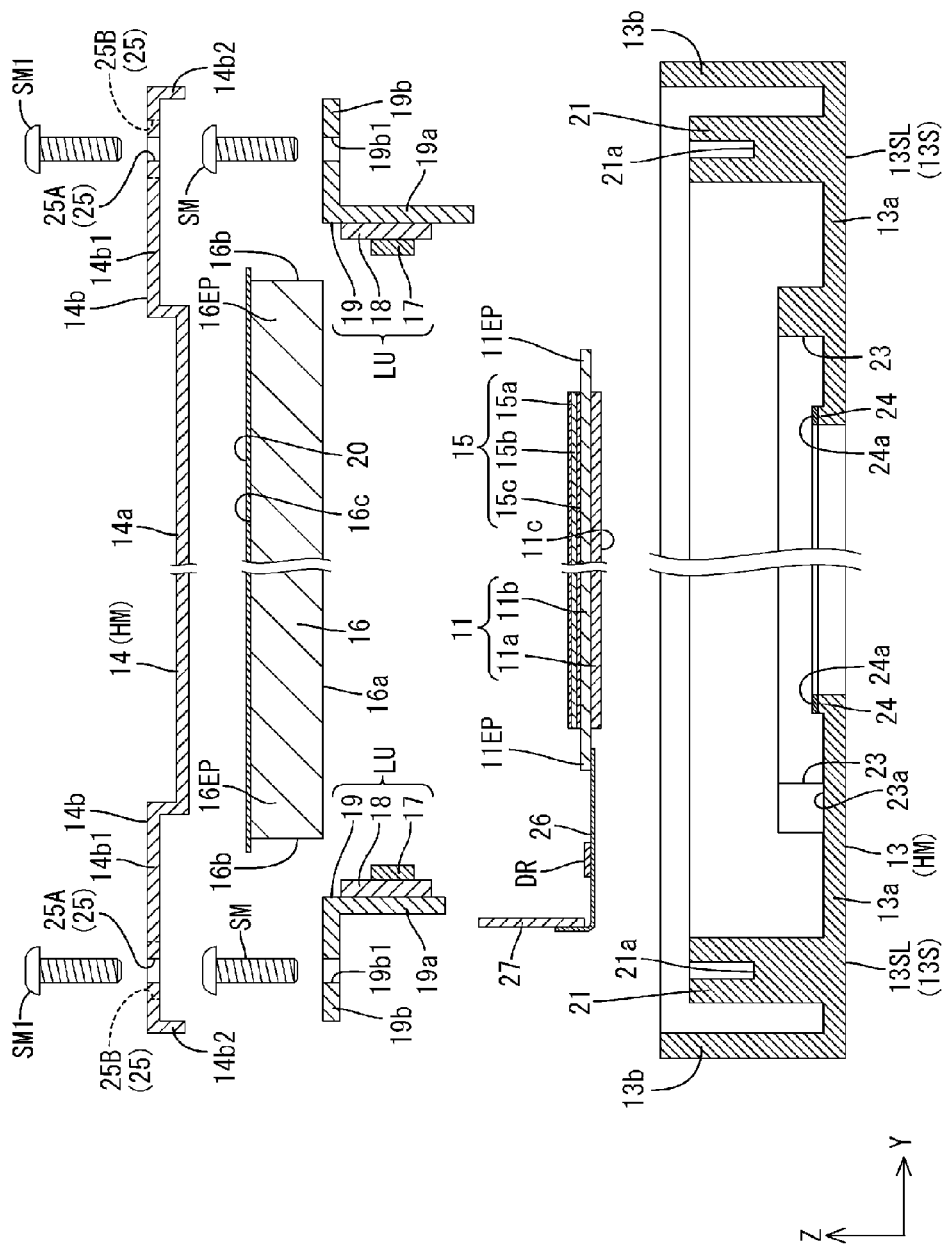
FIG. 13 is a cross-sectional view showing a cross-sectional configuration of the liquid crystal display device along the shorter side direction, the figure illustrating assembly steps for respective constituting components of a liquid crystal display unit in the liquid crystal display device.
Figure 14:
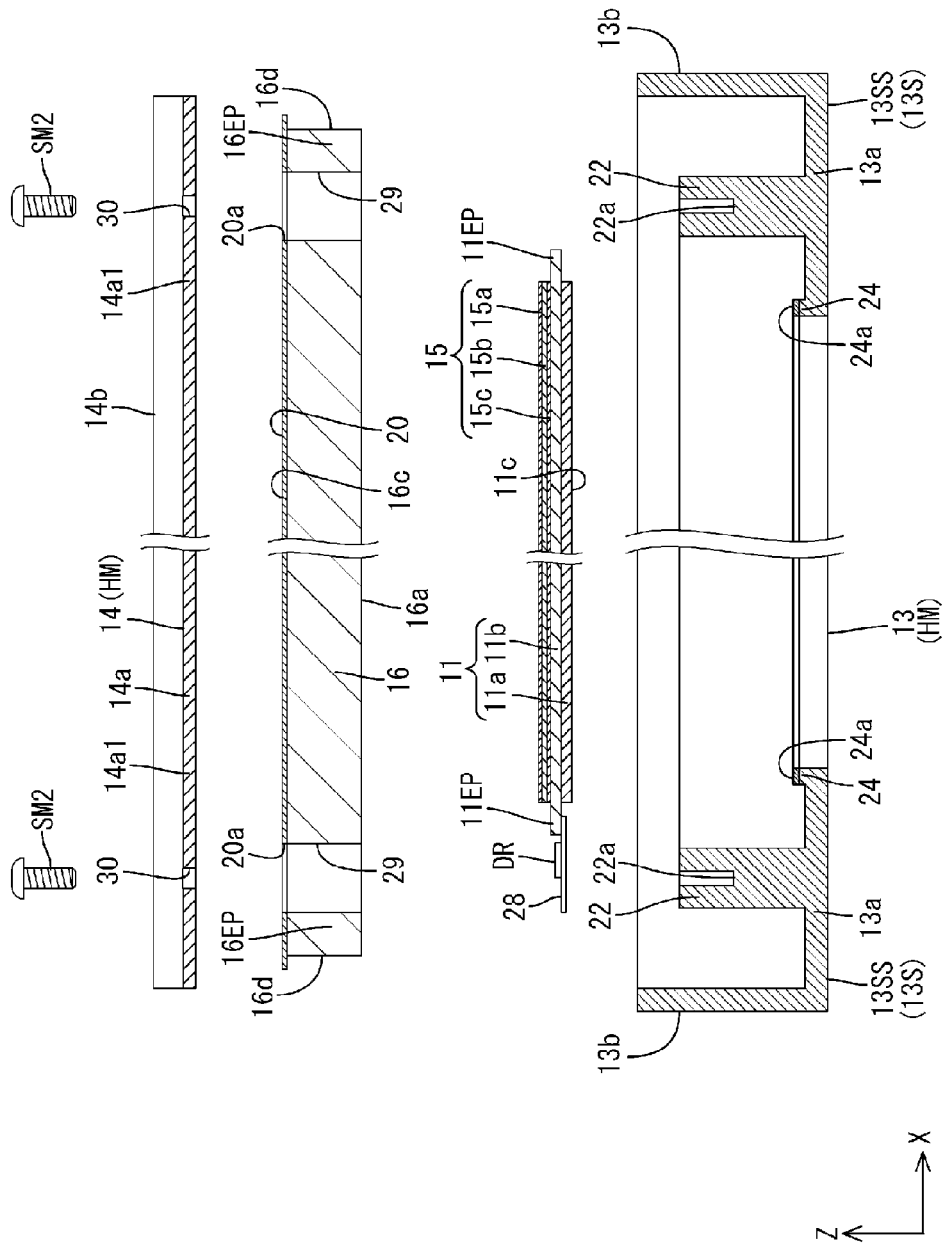
FIG. 14 is a cross-sectional view showing a cross-sectional configuration of the liquid crystal display device along the longer side direction, the figure illustrating assembly steps for respective constituting components of a liquid crystal display unit in the liquid crystal display device.

The present embodiment has the above-mentioned structure, and the operation thereof will be explained next. The liquid crystal display device 10 is manufactured by assembling together respective constituting components that are manufactured separately (frame 13, chassis 14, liquid crystal panel 11, optical members 15, light guide plate 16, LED units LU, and the like). In the assembly process, the respective constituting components are assembled after being flipped over with respect to the Z axis direction from the position shown in FIGS. 4 and 6. First, as shown in FIGS. 13 and 14, the frame 13 among the constituting components is set on a work table (not shown) such that the rear side thereof faces up in the vertical direction. The frame 13 is formed into a frame shape as a whole by connecting four segmented frames 13S.

As shown in FIGS. 13 and 14, the liquid crystal panel 11 has the source-side flexible substrates 26 and the printed boards 27, which are assembled in advance on and connected to an edge portion 11EP in the longer side, and has gate-side flexible substrates 28, which are assembled in advance on and connected to the edge portion 11EP on the shorter side. The liquid crystal panel 11 is assembled onto the frame 13 in the above-mentioned position, the CF substrate 11a being towards the bottom in the vertical direction, the array substrate 11b being towards the top in the vertical direction. As shown in FIG. 13, during assembly, the edge face of the edge portion 11EP in the longer side of the liquid crystal panel 11 can be attached to the inward-facing side faces of the light guide plate supporting member 23. In addition, as shown in FIG. 14, the edge face of the edge portion 11EP in the shorter side of the liquid crystal panel 11 can be attached to the inward-facing side face of the second screw attaching sections 22, and thus the position of the frame 13 is fixed along every direction (X axis direction and Y axis direction) along the display surface 11c. At this point, because the height of the second screw attaching sections 22 protruding from the base wall 13a is enough to penetrate the light guide plate 16, the edge portion 11EP in the shorter side of the liquid crystal panel 11 is not likely to ride on the second screw attaching sections 22, and the edge portion 11EP in the shorter side of the liquid crystal panel 11 is more likely to come into contact with the side face of the second screw attaching sections 22. Meanwhile, as shown in FIGS. 13 and 14, the surface on the front side of the liquid crystal panel 11 in the Z axis direction is received by the cushioning material 24a attached to the panel pressing member 24 of the frame 13, and the liquid crystal panel 11 is supported from the front side, or in other words, the bottom side in the vertical direction during assembly. Furthermore, as shown in FIG. 13, the printed board 27 has a surface that is arranged along the surface of the first screw attaching sections 21 of the frame 13 facing the liquid crystal panel 11, and is attached to the first screw attaching sections 21. Due to this, the source-side flexible substrates 26 are bent into a substantially L-shape. During this assembling process, the position of each source-side flexible substrate 26 with respect to the respective flexible substrate inserting grooves 23a of the light guide plate supporting member 23 that overlap in a plan view is fixed and the flexible substrates 26 are inserted therein. Next, the respective optical members 15 are directly stacked on the rear side of the liquid crystal panel 11 in an appropriate order.

On the other hand, as shown in FIG. 13, the LED units LU having the LEDs 17, the LED substrates 18, and the heat dissipating members 19 assembled together are attached to the frame 13. The LED units LU are attached to the respective first screw attaching sections 21 of the frame 13 so that the LEDs 17 face the central side (inner side) of the frame 13 and the heat dissipating section 19b of the heat dissipating member 19 opposed the first screw attaching sections 21 of the frame 16. When the respective LED units LU are attached to the respective first screw attaching sections 21, the respective insertion holes 19b1 of the heat dissipating section 19b are continuous with the screw fastening grooves 21a of the first screw attaching sections 21. Furthermore, among the pair of LED units LU, those that are positioned so as to overlap the source-side flexible substrates 26 in a plan view have the substrate housing space BS between the LED attachment sections 19a and the first screw attaching sections 21 when the heat dissipating member 19 is attached to the first screw attaching sections 21, the printed board 27 being housed in the substrate housing space BS. When the LED unit LU is attached to the first screw attaching sections 21 in this manner, then the first screw SM1 is screwed into the screw fastening groove 21a of the first screw attaching sections 21 passing through the prescribed insertion hole 19b1 of the heat dissipating section 19b from the rear side. The LED unit LU is attached to the first screw attaching section 21 during the step of assembling the chassis 14 which will be described next by holding the heat dissipating section 19b of the heat dissipating member 19 between the first screws SM1 and the first screw attaching sections 21 (refer to FIG. 7). The LED units LU may be attached to the frame 13 before the optical members 15 are attached or the liquid crystal panel 11 is attached.

After fastening the LED units LU to the first screw attaching sections 21 with screws, as shown in FIGS. 13 and 14, the light guide plate 16 is directly stacked on the rear side of the rearmost optical member 15. As shown in FIG. 14, the respective holes 29 formed in the edge portions 16EP of the two shorter sides of the light guide plate are arranged to match the second screw attaching sections 22 of the frame 13 in a plan view, and the light guide plate 16 is disposed on the optical members 15 along the Z axis direction. If the positions of the respective screw attaching sections 22 and the respective holes 29 match, then the light guide plate 16 is placed on the optical members 15 by having the respective second screw attaching sections 22 inserted into the respective holes 29. In this state, the outer surfaces of the respective second screw attaching sections 22 oppose the entire inner surface of the respective holes, and thus, even if the light guide plate 16 changes position slightly along the surface thereof in the X axis direction or the Y axis direction, by having the respective second screw attaching parts 22 attached to the respective holes 29, further positional change is restricted. As a result, the position of the light guide plate 16 is appropriately fixed in the directions along the surfaces thereof. Furthermore, as shown in FIG. 13, both edge portions 16EP in the longer side of the light guide plate 16 are supported from the front side of the light guide plate supporting members 23 of the frame 13, or in other words, from the bottom side in the vertical direction during assembly. After the light guide plate 16 is attached, then the light guide reflective sheet 20 is directly stacked onto the surface 16c opposite to the light exiting surface 16a of the light guide plate 16. The position of the light guide reflective sheet 20 is fixed in a manner similar to the light guide plate 16 by having the respective second screw attaching sections 22 being inserted into the respective connecting holes 20a formed in the edge portion of the two shorter sides thereof.

After attaching the liquid crystal panel 11, the optical members 15, the light guide plate 16, and the LED units LU to the frame 13 as described above, a process to attach the chassis 14 is performed. As shown in FIGS. 13 and 14, the chassis 14 is attached to the frame 13 with the front side thereof facing down in the vertical direction. At this time, by inserting the respective outer housing portion side walls 14b2 of the respective LED housing portions 14b of the chassis 14 into the gaps between the side walls 13b on the respective longer sides of the frame 13 and the first screw attaching sections 21, the chassis 14 can be positioned with respect to the frame 13. During assembly, the head portion of the first screw SM1, which is attached to the heat dissipating member 19 and the first screw attaching sections 21 in advance, passes through the respective screw hole for the heat dissipating member 25B of both LED housing portions of the chassis 14 (refer to FIG. 7). Then, as the bottom plate 14a of the chassis 14 is attached to the light guide plate 16 (light guide reflective sheet 20), the respective second LED mounting portions 14a1 of the bottom plate 14a are attached to the respective second screw attaching sections 22, and the first LED mounting portions 14b1 of the respective LED housing portions 14b are attached to the heat dissipating sections 19b of the respective heat dissipating members 19. The second screws SM2 pass through the respective second screw holes 30 of the second LED mounting portions 14a1 of the bottom plate 14a from the rear side, and the first screws SM1 pass through the respective fastening screw holes 25A of the first LED mounting portions 14b1 of the respective LED housing portions 14b. By fastening the first screws SM1 to the screw fastening grooves 21a of the first screw attaching sections 21, the first LED mounting portions 14b1 and the heat dissipating sections 19b of the heat dissipating members 19 are sandwiched between the first screws SM1 and the first screw attaching sections 21. Meanwhile, the second screws SM2 are fastened to the second screw attaching sections 22 of the screw fastening holes 22a, the second LED mounting portions 14a1 being held between the second screws SM2 and the second screw attaching sections 22. As a result, the LED units LU and the chassis 14 are attached and held between the respective screw attaching sections 21 and 22 of the frame 13 and the respective screws SM1 and SM2 (refer to FIG. 6). The respective screws SM1 and SM2 are disposed on the rear side of the chassis 14, which constitutes the rear exterior of the liquid crystal display device 10, and are difficult to perceive from the front side or by the user of the liquid crystal display device 10; therefore, the exterior of the liquid crystal display device 10 has a clean and excellent design.

The assembly of the liquid crystal display unit LDU is completed in the manner described above. Next, after the stand attachment member STA and various boards PWB, MB, and CTB are attached to the rear side of the liquid crystal display unit LDU, the stand ST and the cover member CV are attached to the rear side, thereby completing the liquid crystal display device 10 and the television receiver TV. In the liquid crystal display device 10 manufactured in this manner, the exterior thereof is constituted of the frame 13 that presses the liquid crystal panel 11 from the display surface 11c side, and the chassis 14 of the backlight device 12, and the liquid crystal panel 11 is directly stacked on the optical members 15. Therefore, compared to a conventional configuration in which a cabinet made of a synthetic resin is provided in addition to the frame 13 and the chassis 14, or in which a panel receiving member is provided between the liquid crystal panel 11 and the optical members 15 so as to keep the two from making contact with each other, the number of parts and the assembly steps can be reduced, resulting in a lower manufacturing cost, and the size and weight reduction.

When the liquid crystal display device 10 that is manufactured in the manner above is turned ON, as shown in FIG. 4, power is supplied from the power supply board PWB and the driving of the liquid crystal panel 11 is controlled by various signals from the control board CTB supplied to the liquid crystal panel 11 through the printed boards 27 and the flexible substrates 26 and 28 (respective drivers DR), and the respective LEDs 17 forming a part of the backlight device 12 are driven. By passing through the optical members 15 after being guided by the light guide plate 16, light from the respective LEDs 17 is converted to an even planar light, which then illuminates the liquid crystal panel 11, and a prescribed image is displayed on the liquid crystal panel 11. To explain the operation of the backlight device 12 in detail, when the respective LEDs 17 are lit, light emitted from the respective LEDs 17 enters the light receiving faces 16b of the light guide plate 16 as shown in FIG. 6. In the process of traveling through the light guide plate 16 while being subject to the total reflection at the boundary faces between the light guide plate 16 and external air spaces, being reflected by the light guide reflective sheet 20, and the like, the light that has entered through the light receiving faces 16b is reflected or diffused by reflective portions and diffusion portions that are not shown, and thereby outputted from the light exiting surface 16a and radiated to the optical members 15.

In the liquid crystal display device 10 of the present embodiment, the liquid crystal panel 11 is directly stacked on the light guide plate 16 and the optical members 15, and a panel receiving member is not interposed therebetween unlike the conventional configuration. Conventional panel receiving members supported the edge portions 11EP of the liquid crystal panel 11 from the rear side and had a function of blocking light from the rear side entering the liquid crystal panel 11. Due to this, once the panel receiving members are simply eliminated, the light leaking from the LED non-facing edge faces 16d that do not face the LEDs 17, the light exiting surface 16a, and the like will more easily enter the liquid crystal panel 11 side of the edge portions 16EP on the shorter side of the light guide plate 16. At this point, as the base wall 13a of the frame 13 that has the panel pressing member 24 undergoes deformation such as warping or bending, and thus, if the panel pressing member 24 opens towards the front side so as to be separated from the liquid crystal panel 11, then the light mentioned above may leak towards the outside through the gap. On the other hand, the liquid crystal display device 10 of the present embodiment is arranged such that the second screw attaching sections 22 among the fixing structures for the frame 13 and the chassis 14, the second screw attaching sections 22, and the second screw SM are inserted into the holes 29 formed on the edge portions 16EP of the light guide plate 16. Thus, compared to a configuration in which the fixing structure of the light guide plate 16 is arranged towards the outside of the edge portions 16EP of the light guide plate 16, the distance between the fixing structure and the panel pressing member 24 becomes relatively shorter. Due to this, deformations such as bending and warping are unlikely to occur between the second screw attaching sections 22 and the panel pressing member 24 of the base wall 13a of the frame 13, and thus, the panel pressing member 24 is less likely to move away from the liquid crystal panel 11. Thus, because a gap is less likely to form between the panel pressing member 24 and the liquid crystal panel 11, the light inside is less likely to leak outside through the gap.

Furthermore, in the present embodiment, each screw SM1 and SM2 is attached to the respective screw attaching sections 21 and 22 along the Z axis direction or the direction in which the liquid crystal panel 11, the optical members 15, and the light guide plate 16 are layered. Thus, enough force can be applied stably to hold the liquid crystal panel 11, the optical members 15, and the light guide plate 16 together, and a gap is even more unlikely to form between the panel pressing member 24 and the liquid crystal panel 11. By applying enough force to hold the liquid crystal panel 11, the optical members 15, and the light guide plate 16, these members 11, 15, and 16 are kept in close contact with each other in substantially the entire region within the respective surfaces. As a result, the amount of light provided to the display surface 11c of the liquid crystal panel 11 becomes even within the surface, and thus, high display quality for images can be achieved. Furthermore, in the present embodiment, the second screw attaching sections 22 is disposed adjacent to and in contact with the edge portions 11EP on the shorter side of the liquid crystal panel 11. Thus, the second screw attaching sections 22 are disposed even closer to the panel pressing member 24, making it less likely for a gap to form between the panel pressing member 24 and the liquid crystal panel 11.

As explained above, the liquid crystal display device (display device) 10 of the present embodiment includes: LEDs (light source) 17; the liquid crystal panel (display panel) 11 that performs display with light from the LEDs 17; the light guide plate 16 that is disposed so as to overlap the side opposite to the display surface 11c of the liquid crystal panel 11 and that has end faces (light receiving faces 16b) facing the LEDs 17, the edge portions 16EP being disposed further towards the outside than the edge portions 11EP of the liquid crystal panel 11; the holding members constituted of the frame 13 and the chassis 14, which are a pair of holding portions that hold the liquid crystal panel 11 and the light guide plate 16 by sandwiching the liquid crystal panel 11 and the light guide plate 16 from the display surface 11c side and the side opposite thereto; a panel pressing member 24 that presses the liquid crystal panel 11 from the display surface 11c side, the panel pressing member 24 being provided on the frame 13, which is a holding portion disposed on the display surface 11c side of the liquid crystal panel 11 among the frame 13 and the chassis 14 constituting the pair of holding portions; the holding member HM that houses the LEDs 17 between the frame 13 and the chassis 14 constituting the pair of holding portions, the second screw attaching sections (fastening member attaching sections) 22 that are provided on the frame 13, which is one of the pair of holding portions constituted of the frame 13 and the chassis 14; a second screw (fixing member) SM2 that fixes the frame 13 and the chassis 14 constituting the pair of holding portions by being attached to the second screw attaching sections 22 and holding in place the chassis 14, which is the other holding portion among the holding portions constituted of the frame 13 and the chassis 14; and holes 29 that are formed in the edge portions 16EP of the light guide plate 16 and in which one of the second screw attaching sections 22 or the second screws SM2 are inserted.

With this configuration, light emitted by the LEDs 17 enters the edge face of the light guide plate 16 and then is guided to the liquid crystal panel 11 after being transmitted inside the light guide plate 16, and an image is displayed on the liquid crystal panel 11 with the light. From the display surface 11c side, the liquid crystal panel 11 is pressed by the panel pressing member 24 provided on the frame 13, which is one of the pair of holding portions constituted of the frame 13 and the chassis 14, the frame 13 being disposed on the display surface 11c side of the liquid crystal panel 11. On the second screw attaching sections 22 provided on the frame 13, which is one of the pair of holding portions constituted of the frame 13 and the chassis 14, the second screw SM2 is screwed in, holding in place at least the other holding portion, that is, the chassis 14, and thus, the pair of holding portions constituted of the frame 13 and the chassis 14 are fixed so as to sandwich the liquid crystal panel 11 and the light guide plate 16, which are stacked one on top of the other. Because one of the second screw attaching sections 22 or the second screws SM2 are configured to be inserted into the holes 29 that are provided on the edge portions 16EP of the light guide plate 16, compared to a case in which the second screw attaching sections and the second screws are disposed further outside than the edge portions 16EP of the light guide plate 16, a pair of holding portions constituted of the frame 13 and the chassis 14 are fixed in a location closer to the panel pressing member 24. As a result, within the frame 13 that is disposed towards the display surface 11c of the liquid crystal panel 11, the distance from the fastening location of the second screw attaching sections 22 and the second screws SM2 to the panel screw attaching section 24 is shorter. Thus, the portion between the fastening location and the panel pressing portion 24 of the frame 13 disposed towards the display surface 11c is less likely to have warping and bending, and the panel pressing member 24 is less likely to separate from the liquid crystal panel 11. Thus, because a gap is less likely to form between the panel pressing member 24 and the liquid crystal panel 11, the light inside is less likely to leak through the gap. According to the present embodiment, light leakage can be suppressed.

Furthermore, the second screws SM2 are attached to the second screw attaching sections 22 along the direction in which the liquid crystal panel 11 and the light guide plate 16 are layered. In this manner, the pair of holding portions constituted of the frame 13 and the chassis 14 fixed by the second screws SM2 and the second screw attaching sections 22 can apply sufficiently high holding force to the liquid crystal panel 11 and the light guide plate 16 along the direction in which the liquid crystal panel 11 and the light guide plate 16 are layered. As a result, even for structures without a panel receiving member interposed between the light guide plate 16 and the liquid crystal panel 11 such as in conventional configurations, the liquid crystal panel 11 and the light guide plate 16 can be held stably with sufficient holding force, and gaps are less likely to form between the panel pressing member 24a and the liquid crystal panel 11.

Furthermore, the frame 13, which is one of the holding portions, is disposed towards the display surface 11c of the liquid crystal panel 11, and the other holding portion, that is, the chassis 14, is disposed on the side of the light guide plate 16 opposite to the display surface 11c, and the second screws SM2 are screwed in from the side of the light guide plate 16 opposite to the display surface 11c relative to the second screw attaching sections 22. In this manner, it is possible to perform manufacturing in the order of: assembling the liquid crystal panel 11, the light guide plate 16, and the chassis 14 disposed on the side opposite to the display surface 11c in that order onto the frame 13, which is one of the holding portions disposed on the display surface 11c side; and then attaching the second screws SM2 to the second screw attaching sections 22 from the side opposite to the display surface 11c side. Because this kind of manufacturing process is possible, excellent assembly productivity and productivity can be attained.

Furthermore, the pair of holding portions constituted of the frame 13 and the chassis 14 are exterior members that form the exterior of the liquid crystal display device 10. In this manner, the second screws SM2 are more difficult to see from the display surface 11c side, and the exterior of the liquid crystal display device 10 can have an excellent appearance.

Furthermore, by attaching the edge portions 11EP of the liquid crystal panel 11, the position of the second screw attaching sections 22 is fixed in a direction along the display surface 11c of the liquid crystal panel 11. In this manner, the second screw attaching sections 22 provided on the frame 13, which is one of the holding portions arranged on the display surface 11c side of the liquid crystal panel 11, are inserted into the holes 29 formed in the edge portions 16EP of the light guide plate 16 that is disposed on the side of the liquid crystal panel 11 opposite to the display surface 11c, the second screw attaching sections 22 protruding farther towards the display surface 11c than the liquid crystal panel 11 by an amount approximately equal to the plate thickness of the light guide plate 16, for example. Therefore, when the liquid crystal panel 11 is assembled with the frame 13, which is one of the holding portions, the edge portions 11EP of the liquid crystal panel 11 can be more reliably abutted to the second screw attaching sections 22. Due to this, the position of the liquid crystal panel 11 can be fixed more reliably. Furthermore, because the second screw attaching sections 22 are disposed so as to be attached to the edge portions 11EP pf the liquid crystal panel 11, the second screw attaching sections 22 are disposed even closer to the panel pressing member 24. Due to this, within one of the holding portions, that is, the frame 13, the portion between the second screw attaching sections 22 and the panel pressing member 24 is less likely to have warping, bending, and the like, and the panel pressing member 24 is less likely to separate from the liquid crystal panel 11. Thus, a gap between the panel pressing member 24 and the liquid crystal panel 11 is less likely to form, and light from the LEDs 17 is less likely to leak from the gap.

In addition, the second screw attaching sections 22 fixes the light guide plate 16 in the directions along the surface thereof by being inserted into the holes 29 and being in contact with the respective inner surfaces thereof. In this manner, when the light guide plate 16 is assembled to the frame 13, which is one of the holding portions, by inserting the second screw attaching sections 22 provided on the frame 13 into the holes 29 of the light guide plate 16, thereby fixing the position of the light guide plate 16 in the directions along the surface thereof. In other words, as the position of the light guide plate 16 can be fixed in the step prior to assembling the chassis 14, which is the other holding portion, and thus, the process of fixing the position of the light guide plate 16 if it is out of place can be accomplished with ease, thereby making the process easier.

Furthermore, the light guide plate 16 has the light receiving faces (light source facing edge faces) 16b that are disposed so as to oppose the LED 17, and the LED non-facing edge faces (light source non-facing edge faces) 16d that do not oppose the LEDs 17, and the edge portions 16EP of the light guide plate 16 have LED non-facing edge faces and the holes 29. In this manner, light from the LEDs 17 enters the light receiving faces 16b of the light guide plate 16 and is transmitted in the light guide plate 16, but because the holes 29 are formed in the edge portions 16EP that have the LED non-facing edge faces 16d, the light transmitted in the light guide plate 16 is less likely to leak from the holes 29.

Furthermore, the respective inner surfaces of the holes 29 come into contact with either the second screw attaching sections 22 or the second screws SM2, thereby fixing the position of the light guide plate 16 in the directions along the surface thereof. In this manner, the position of the light guide plate 16 can be fixed in the directions along the surface thereof by either the second screw attaching portions 22 or the second screws SM2 inserted into the holes 29 formed on the edge portions 16EP. In other words, either the second screw attaching sections 22 or the second screws SM2, which are structures that fix the pair of holding portions constituted of the frame 13 and the chassis 14, are additionally structures that fix the position of the light guide plate 16. Therefore, with the fixing structure of the pair of holding portions constituted of the frame 13 and the chassis 14, it is possible to reduce the space taken up compared to a case in which the fixing structure is disposed farther towards the outside than the edge portions 16EP of the light guide plate 16, thereby allowing the frame portion of the liquid crystal display device 10 to be made narrower.

Furthermore, the liquid crystal display device 10 is provided with the gate-side flexible substrates (panel connecting members) 28 that are connected to the edge portions 11EP of the liquid crystal panel 11 and are disposed so as to protrude outwards from the edge portions 11EP, and the second screws SM2 and the second screw attaching sections 22 are also provided along the edge portions 11EP of the liquid crystal panel 11 for each gate-side flexible substrate 28. In this manner, because the second screws SM2 and the second screw attaching sections 22 are provided so as to be aligned along the edge portions 11EP of the liquid crystal panel 11 for gate-side flexible substrate 28 that protrude outwards from the edge portions 11EP of the liquid crystal panel 11, and thus, compared to a case in which the second screws and the second screw attaching sections are provided further outwards than the gate-side flexible substrates 28, the frame can be further narrowed.

Furthermore, a plurality respectively of the second screws SM, the second screw attaching sections 22, and the gate-side flexible substrates 28 are disposed alternately so as to be aligned along the edge portions 11EP of the liquid crystal panel 11. In this manner, compared to a case in which a plurality of pairs of the second screws and the second screw attaching sections are disposed so as to be aligned continuously, the fastening locations of the second screws SM2 and the second screw attaching sections 22 to the frame 13 and the chassis 14 constituting the pair of holding portions are more distributed, and thus the liquid crystal panel 11 and the light guide plate 16 can be more reliably held.

<Embodiment 2>

Embodiment 2 of the present invention will be described with reference to FIG. 15. In Embodiment 2, the form of a second screw attaching section 122 is modified. Descriptions of structures, operations, and effects similar to those of Embodiment 1 will be omitted.

Figure 15:
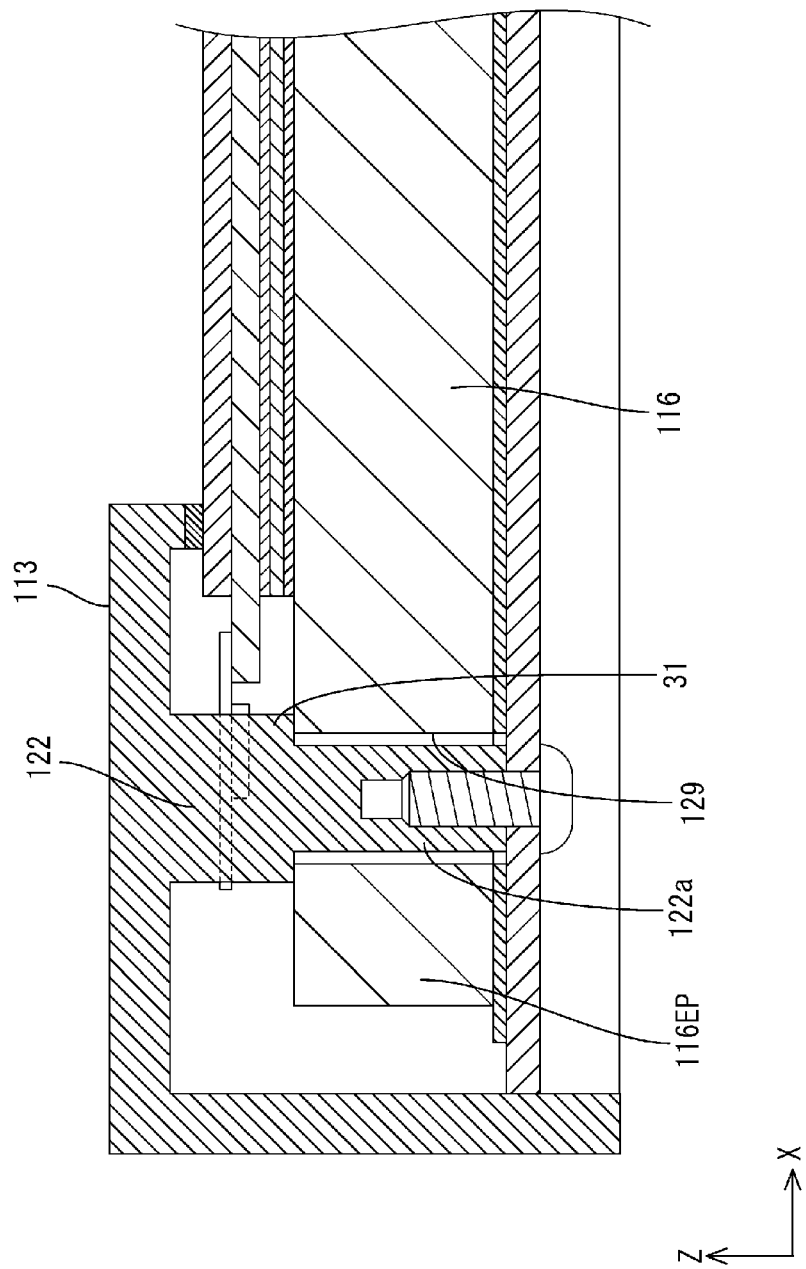
FIG. 15 is a cross-sectional view of the second screw attaching section, the second screw, and the hole.

As shown in FIG. 15, the second screw attaching section 122 of the present embodiment is provided with a supporting portion 31 that supports the edge portion 116EP on the shorter side of the light guide plate 116 from the front side. Specifically, the diameter (width) of the second screw attaching section 122 changes in the middle of the protruding direction (Z axis direction). The insertion part 122a that is inserted into a hole 129 of a light guide plate 116 has a smaller diameter than the portion that is disposed farther towards the front than the light guide plate 116, the portion with a wider diameter than the insertion part 122a being the supporting portion 31 that is a step. The supporting portion 31 has a substantially circular ring shape that surrounds the entire periphery of the insertion part 122a. The supporting portion 31 is in contact with almost the entire periphery of the edge of the hole 129 among the edge portion 116EP in the shorter side of the light guide plate 116, and supports the edge portion 116EP from the front side through pressing. Due to this supporting portion 31, deformations such as warping and bending are less likely to occur in the light guide plate 116, and the position of the hole 129 that is provided on the edge portion 116EP becomes highly accurate. Thus, by inserting the insertion part 122a of the second screw attaching section 122 into the hole 129, the position of the light guide plate 116 can be fixed more accurately.

As explained above, with the present embodiment, the second screw attaching section 122 is provided with the supporting portion 31 that supports the edge portion 116EP of the light guide plate 116 from the side opposite to the second screw SM2. In this manner, when the light guide plate 116 is assembled to the frame 113, which is one of the holding portions, the second screw attaching section 122 provided on the frame 113 is inserted into the hole 129 of the light guide plate 116, the supporting portion provided on the second screw attaching section 122 supporting the edge portion 116EP of the light guide plate 116 from the side opposite to the second screw SM2. As a result, because the light guide plate is less likely to undergo deformation such as warping or bending, the accuracy of the position of the hole 129 formed on the edge portion 116EP becomes high, and the position of the light guide plate 116 can be more accurately fixed.

<Embodiment 3>

Embodiment 3 of the present invention will be described with reference to FIG. 16 or 17. In Embodiment 3, a pair of cabinets 32 and 33 is added as an exterior member. Descriptions of structures, operations, and effects similar to those of Embodiment 1 will be omitted.

Figure 16:
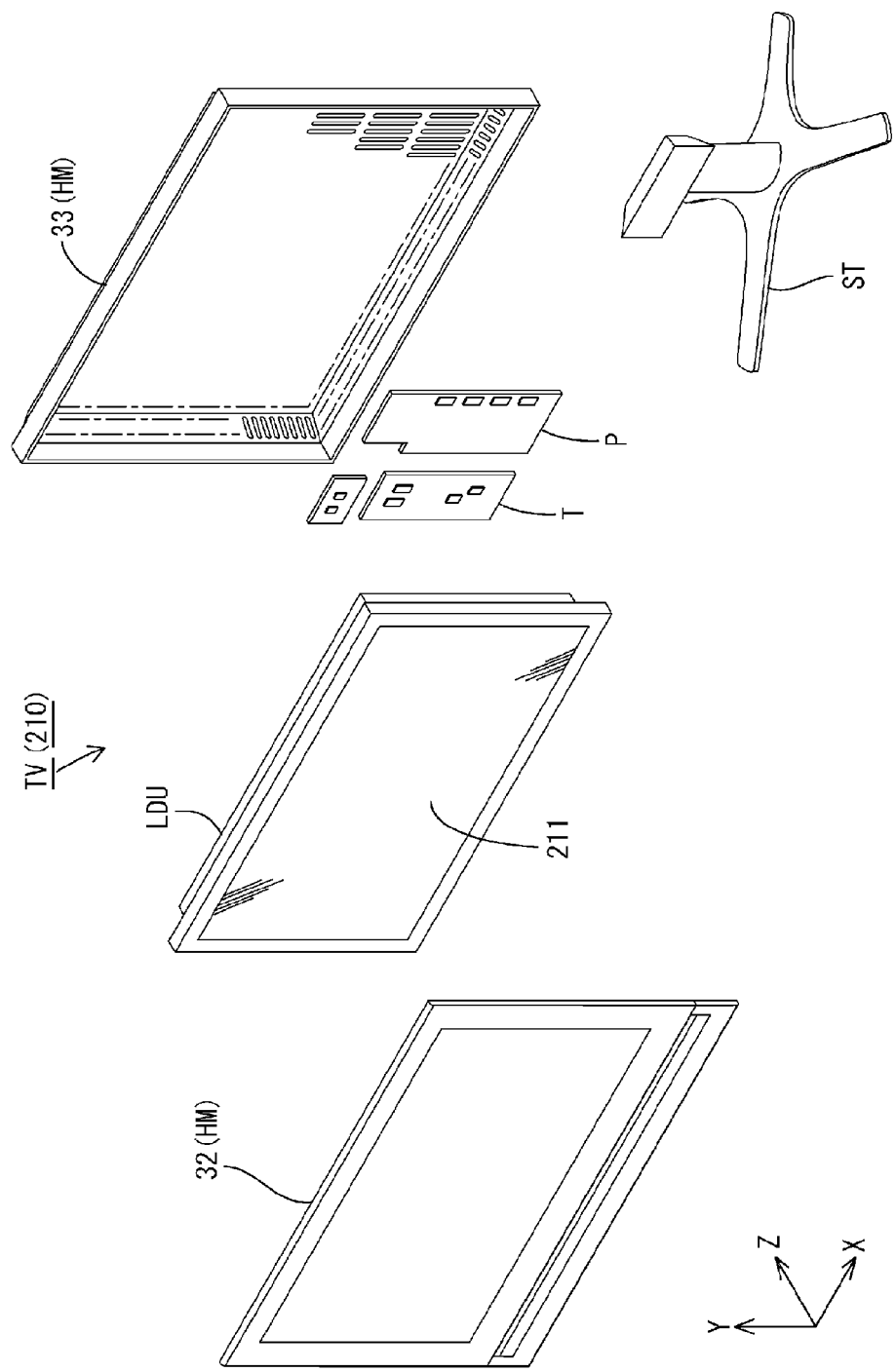
FIG. 16 is an exploded perspective view that shows a schematic configuration of a television receiver and a liquid crystal display device according to Embodiment 3 of the present invention.

As shown in FIG. 16, the liquid crystal display device 210 and the television receiver TV of the present embodiment are provided with a liquid crystal display unit (display unit) LDU, the pair of front and rear cabinets 32 and 33 that houses the liquid crystal display unit LDU by sandwiching it, a power source P, a tuner and a stand S. The liquid crystal display unit LDU is provided with a liquid crystal panel 211 and a backlight device 212, and these are housed within the pair of cabinets 32 and 33, which are exterior members that form the exterior of the liquid crystal display device 210. The pair of cabinets 32 and 33 constitutes the exterior member of the liquid crystal display device 210 and forms a portion of the holding member HM mentioned next.

Figure 17:
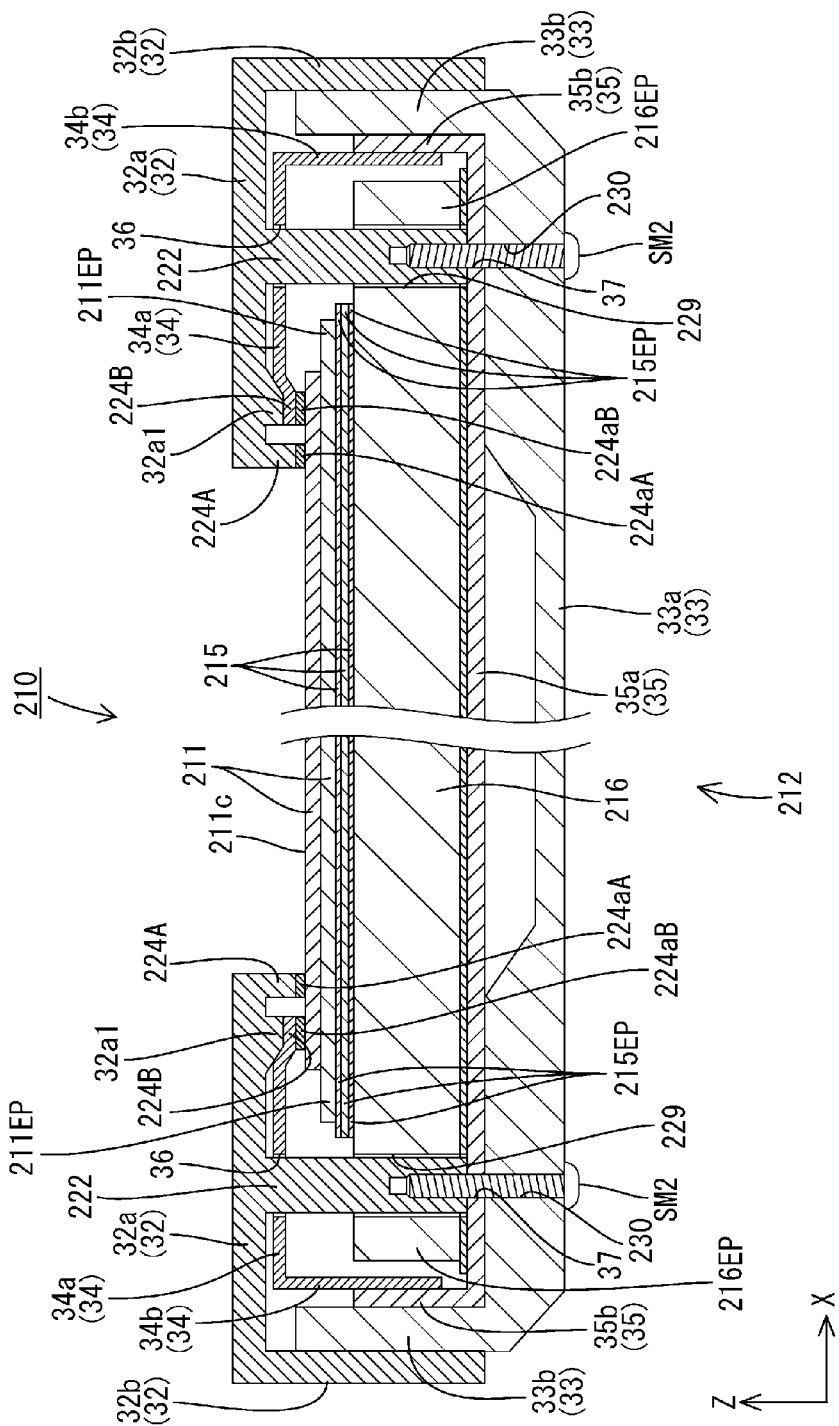
FIG. 17 is a cross-sectional view of a configuration of a liquid crystal display device along the longer side direction.

As shown in FIG. 17, the holding member HM of the liquid crystal display device 210 sandwiches and holds the liquid crystal panel 211, the optical members 215, and the light guide plate 216 that are stacked together from the front and rear, and includes a first cabinet (outer side holding portion, first outer side holding portion) 32 disposed towards the front of the liquid crystal panel 211, an inner frame 34 (inner holding portion, first inner holding portion) 34 disposed towards the inside of the first cabinet 32, a second cabinet (second outer side holding portion) 33 disposed towards the rear of the light guide plate 216, and an inner chassis (second inner holding portion) 35 that is disposed towards the inner side of the second cabinet 33. In other words, the holding member HM of the present embodiment has a double-structure with two parts disposed in the inner side and the outer side.

As shown in FIG. 17, the first cabinet 32 is formed of synthetic resin, and has a horizontally long frame shape as a whole so as to surround the display region in the display surface 211c of the liquid crystal panel 211. This first cabinet 32 is arranged so as to be adjacent with and further outside than the inner frame 34 mentioned later. The first cabinet 32 has a cross-sectional shape that is substantially L-shaped and is formed of a base wall 32a that is parallel to the display surface 211c of the liquid crystal panel 211 and a side wall 32b that protrudes towards the rear side from the outer side of the base wall 32a. A first panel pressing member 224A that presses the liquid crystal panel 211 from the front side is provided in the inner edge location of the base wall 32a. Furthermore, from the position between the first panel pressing member 224A and the side wall 32b of the base wall 32a, the second screw attaching sections 222 that are inserted into the holes 229 formed on the edge portions 216EP on the shorter side of the light guide plate 216 are provided so as to protrude toward the rear side along the Z axis direction. The second screw attaching sections 222 are disposed further inside than the respective edge portions 211EP and 215EP on the shorter side of the liquid crystal panel 211 and the optical members 215 so as to be adjacent, and the side faces facing inward are in contact with the edge faces of the respective edge portions 211EP and 215EP mentioned above, and the position of the liquid crystal panel 211 and the optical members 215 can be fixed in the X axis direction. Furthermore, the first panel pressing member 224A and the second screw attaching sections 222 have the same configuration as the panel pressing member 24 and the second screw attaching sections 22 of the above-mentioned Embodiment 1, and thus, a detailed explanation will not be provided.

The inner frame 34 that is disposed towards the inner side relative to the first cabinet 32 so as to be adjacent therewith, is metallic (made of metallic plate), and, as shown in FIG. 17, has a frame shape as a whole that is horizontally long along the first cabinet 32. The inner frame 34 has a base portion 34a that is parallel to the base wall 32a, a side portion 34b that is parallel to the side wall 32b and that protrudes towards the rear side from the periphery of the base portion 34a. A second panel pressing member 224B that presses the liquid crystal panel 211 from the front side is provided in the inner edge position of the base wall 34a. The second panel pressing member 224B is disposed farther outside than the first panel pressing member 224A so as to be adjacent therewith. Furthermore, the base wall 32a of the first cabinet 32 has a supplementary pressing portion 32a1 that supports the second panel pressing portion 224B from the front side and that is formed so as to protrude towards the rear. Also, at positions between the second panel pressing member 224B of the base portion 34a and the side portion 33b, the attaching section insertion holes 36 to insert the second screw attaching sections 222 are formed. By having the respective inner surfaces of the attaching section insertion holes 36 come into contact with the respective outer surfaces of the second screw attaching sections 222, the second screw attaching sections 222 can be suppressed from moving in the X axis direction and the Y axis direction. Furthermore, the respective panel pressing members 224A and 224B are provided with respective cushioning materials 224aA and 224aB to cushion the liquid crystal panel 211.

As shown in FIGS. 16 and 17, the second cabinet 33 is made of synthetic resin as is the first cabinet 32, and has a substantially box shape that is open at the front side. The second cabinet 33 has a bottom wall 33a that has a horizontally-long quadrangular shape as in the liquid crystal panel 211 and the light guide plate 216, and has side walls 33b that rise toward the front from the outer edges of the respective sides (a pair of longer side and a pair of shorter sides) of the bottom wall 33a. A portion of the bottom wall 33a that overlaps the edge portions 216EP in the shorter side of the light guide plate 216 has the second screw holes 230 that are continuous with the holes 229 formed, and by inserting the second screw SM2 therein in the Z axis direction from the rear side, the second screws SM2 can be attached to the second screw attaching sections 222 that are inserted into the holes 229.

The inner chassis 35, which is disposed towards the inner side relative to the second cabinet 33 so as to be adjacent therewith, is metallic (made of metallic plate), and as shown in FIG. 17, has a substantially box shape as a whole that is horizontally long similar to the second cabinet 33. The inner chassis 35 is formed of the bottom plate 35a that is parallel to the bottom wall 33a and has a horizontally-long quadrangular shape, and has the side walls 35b that rise toward the front side from the outer edges of the respective sides (a pair of longer side and a pair of shorter sides) of the bottom plate 35a. The bottom plate 35a supports the light guide plate 216 from the rear side, and the bottom wall 33a of the second cabinet 33 supports the bottom plate 35a from the rear side. The bottom plate 35a has connecting holes 37 that are continuous with the second screw holes 230 of the holes 229 and the second cabinet 33 of the light guide plate 216, and allows the second screws SM2 to be inserted therein. The inner surface of the side plates 35b is in contact with the side plates 34b of the inner frame 34, and the outer surface is in contact with the inner surface of the side walls 33b of the second cabinet 33. Furthermore, the respective substrates T and P (refer to FIG. 16) are housed in the space between the bottom plate 35a and the bottom wall 33a of the second cabinet 33.

By turning the power of the liquid crystal display device 210 with the above-mentioned structure on or off, the temperature inside rises or falls, and causes thermal expansion and contraction of the constituting components. At this time, a relatively large contraction and expansion occurs in the members that are made of synthetic resin, which has a greater rate of thermal expansion compared to metal. In particular, in the present embodiment, the first cabinet 32 that is made of synthetic resin and the second screw attaching sections 222 are integrally formed, and when the first cabinet 32 undergoes thermal expansion or contraction, the second screw attaching sections 222 may move greatly in the longer side direction of the first cabinet 32, which is the X axis direction. Here, the second screw attaching sections 222 are disposed relatively inward with respect to the edge portions 211EP and 215EP of the liquid crystal panel 211 and the optical members 215 so as to be adjacent thereto and fix the position of the liquid crystal panel 211 and the optical members 215. Due to this, when the second screw attaching sections 222 move inwards along the X axis direction, then there is a risk that the second screw attaching sections 222 interfere with the edge portions 211EP and 215EP of the liquid crystal panel 211 and the optical members 215 to cause inward stress. In particular, the liquid crystal panel 211 sandwiches a liquid crystal layer between a pair of glass substrates, and thus there is a risk that if such stress as mentioned above occurs, the thickness of the liquid crystal layer may vary in certain locations to cause uneven display. Furthermore, if such stress occurs in the optical members 215, then deformations such as warping, wrinkling, and the like can occur locally to have a negative impact on image display. The present embodiment restricts the change in position of the second screw attaching sections 222 in the X axis direction by having the outer surface of the second screw attaching sections 222 be in contact with the inner surface of the attaching section insertion holes 36 as the second screw attaching sections 222 are inserted into the attaching section insertion holes 36 formed in the inner frame 34 made of metal. Due to this, the display quality of the liquid crystal panel 211 can be kept high because the stress from the second screw attaching sections 222 to the respective edge portions 211EP and 215EP of the liquid crystal panel 211 and the optical members 215 is prevented.

As explained above, according to the present embodiment, one of the holding portions has a metallic inner frame (inner side holding portion) 34 that is disposed relatively inward, and a first cabinet (outer side holding portion) 32 that is disposed relatively outward and is made of synthetic resin. The second screw attaching sections 222 are provided so as to protrude from the first cabinet 32 towards the edge portions 216EP of the light guide plate 216, and the inner frame 34 has attaching section insertion holes (insertion holes) 36 where the second screw attaching sections 222 are inserted. In this manner, if the first cabinet 32 made of synthetic resin thermally expands or contracts, while there is a risk that the second screw attaching sections 222 may move relative to the inner frame 34 made of metal, the inner frame 34 has the attaching section insertion holes 36 where the second screw attaching sections 222 are inserted, and thus, because the second screw attaching sections 222 come into contact with the edges of the attaching section insertion holes 36, the second screw attaching sections 222 can be suppressed from moving.

Furthermore, the inner frame 34 and the first cabinet 32, which constitute one of the holding portions, are disposed on the display surface side 211c of the liquid crystal panel 211, and by having the second screw attaching sections 222 in contact with the edge portions 211EP of the liquid crystal panel 211, the position of the liquid crystal panel 211 can be fixed in the directions along the display surface 211c. As a result, even if the first cabinet 32 made of synthetic resin thermally expands or contracts, by having the second screw attaching sections 222 contact the edges of the attaching section insertion holes 36, the second screw attaching sections 222 are suppressed from moving, and thus, the second screw attaching sections 222 are less likely to cause stress on the edge portions 211EP of the liquid crystal panel 211, which are positioned by the second screw attaching sections. Due to this, the image displayed on the liquid crystal panel 211 can have excellent display quality.

<Embodiment 4>

Embodiment 4 of the present invention will be described with reference to FIG. 18 or 19. In Embodiment 4, the form of the holes 329 has been changed. Descriptions of structures, operations, and effects similar to those of Embodiment 1 will be omitted.

Figure 18:
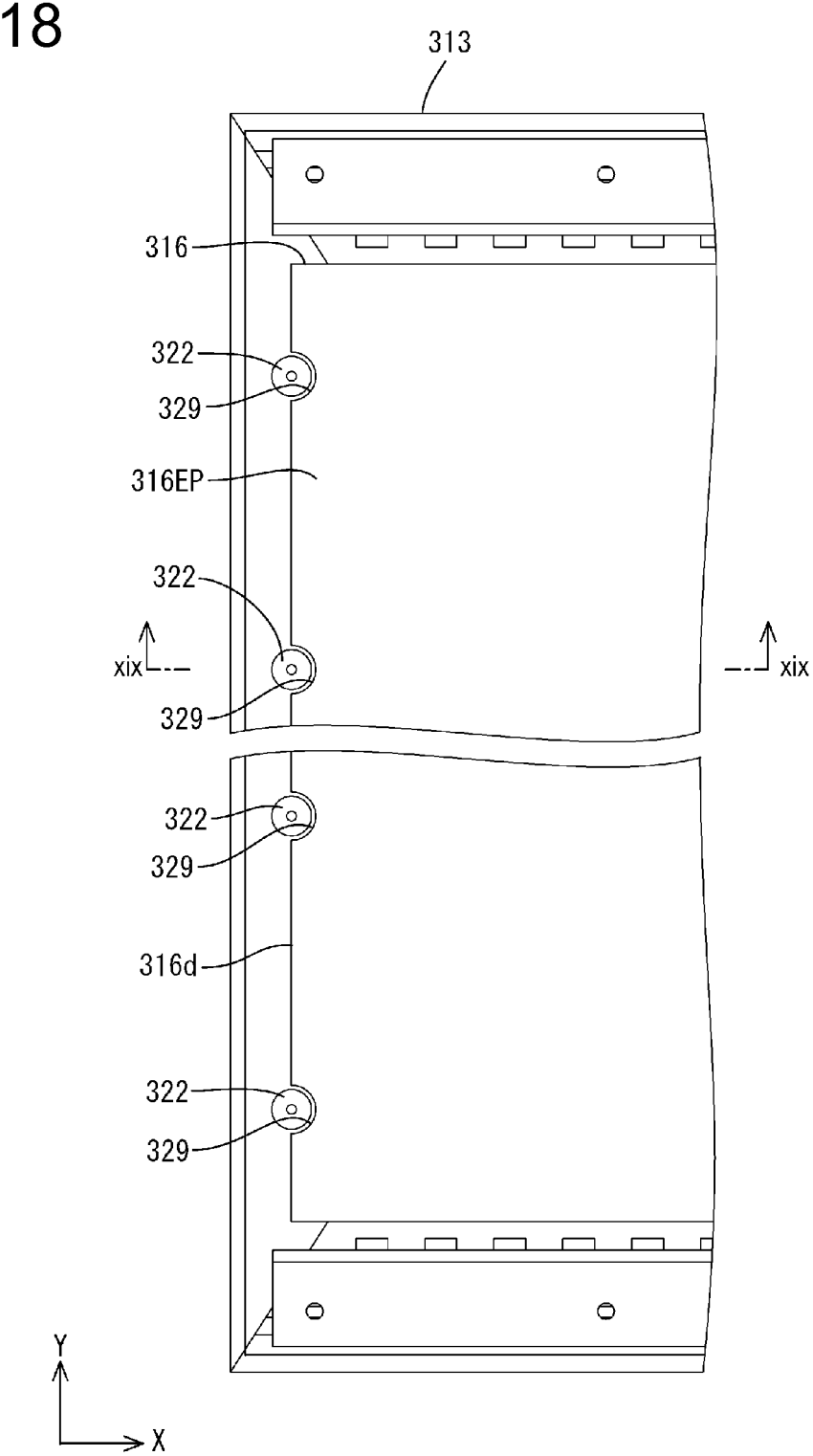
FIG. 18 is an enlarged view of the rear of the frame when an LED unit, a light guide plate, and the like are assembled to the frame.
Figure 19:
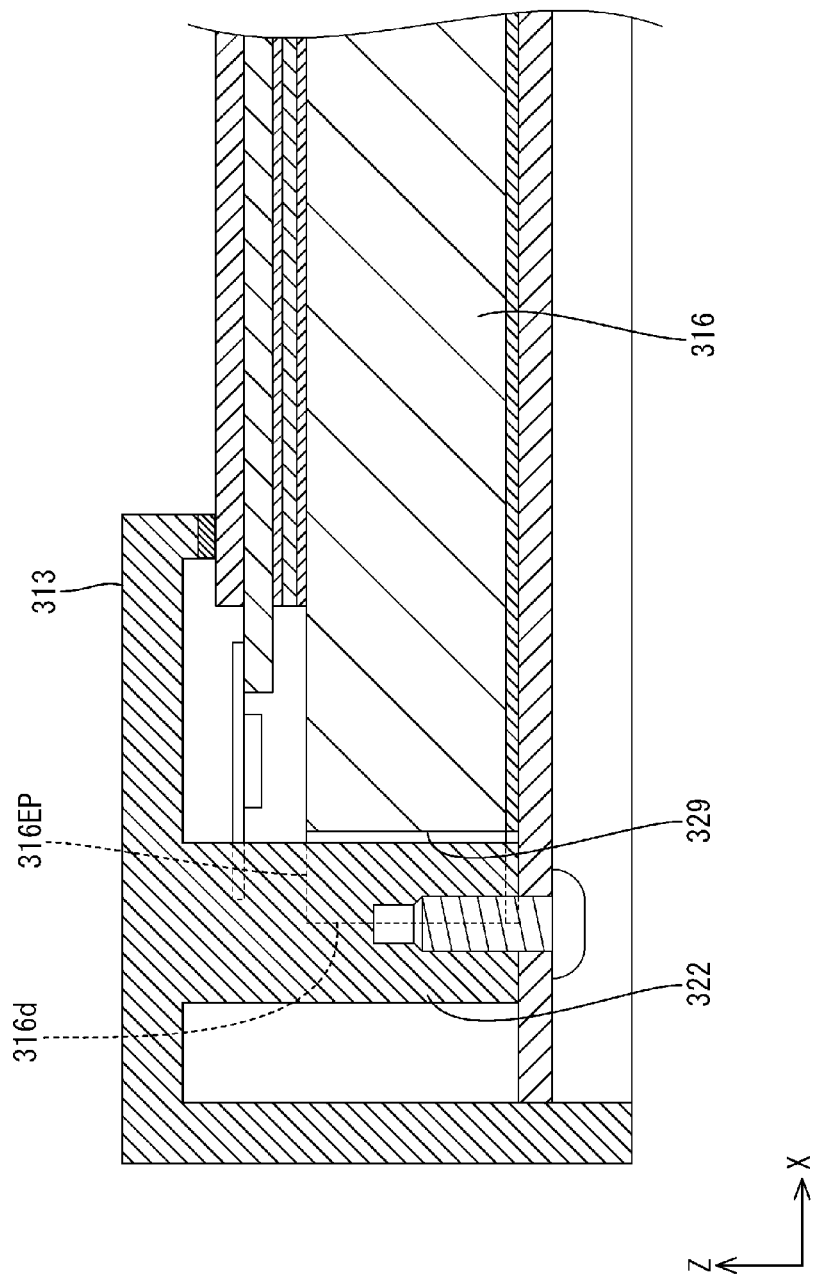
FIG. 19 is a cross-sectional view of FIG. 18 along the line xix-xix.

As shown in FIGS. 18 and 19, the holes 329 of the present embodiment penetrate the edge portions 316EP on the shorter side of the light guide plate 316 along the plate thickness direction (Z axis direction), and have an opening towards the outside in the longer side direction (X axis direction). In other words, the holes 329 are formed by opening a side of the edges of the edge portions 316EP of the light guide plate 316 to form a recess in a portion of the LED non-facing edge faces 316d. The holes 329 have a substantially semicircular shape in a plan view, and substantially the inner halves of the second crew attaching sections 322, which are substantially circular in a plan view, are inserted into the holes 329. As a result, the second screw attaching sections 322 are disposed towards the outside in the X axis direction relative to the LED non-facing edge face 316d of the light guide plate 316, and substantially half of the outer side of each of the second screw attaching sections 322 is disposed on the outside of each of the holes 329.

With the configuration mentioned above, the second screw attaching sections 322 can be inserted into the holes 329 in the Z axis direction and can also be engaged along the X axis direction. Therefore, during assembly, the second screw attaching sections 322 can be inserted in the holes 329 using the method to attach the light guide plate 316 to the frame 313 along the Z axis direction or using the method that in which the light guide plate 316 is slid into the frame 313 along the X axis direction (plate surface). Due to this, the assembly procedure of the light guide plate 316 has more variety, which can lead to improved work efficiency and the like.

As explained above, according to the present embodiment, the holes 329 are formed so as to penetrate the light guide plate 316 in the plate thickness direction, and are open towards the outside along the surface of the light guide plate 316. With this configuration, by sliding the light guide plate 316 along the surface direction thereof, the second screw attaching sections 322 and the second screws SM2 can be inserted with ease into the holes 329. As a result, more variations in the assembly procedure are made possible.

<Embodiment 5>

Embodiment 5 of the present invention will be described with reference to FIG. 20. In Embodiment 5, the plan view shapes of second screw attaching sections 422 and holes 429 are modified. Descriptions of structures, operations, and effects similar to those of Embodiment 1 will be omitted.

Figure 20:
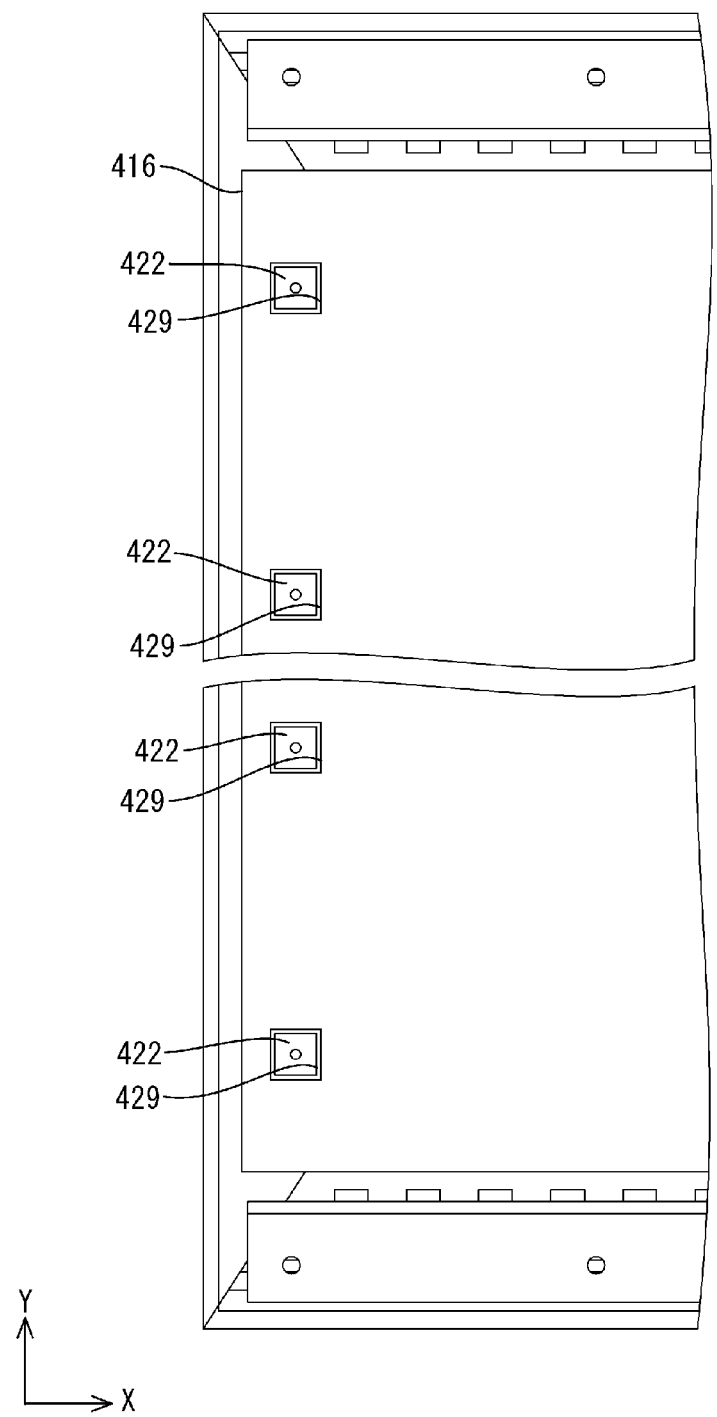
FIG. 20 is an enlarged view of the rear of the frame when an LED unit, a light guide plate, and the like according to Embodiment 5 are assembled to the frame.

As shown in FIG. 20, the second screw attaching sections 422 and the holes 429 of the present embodiment have a substantially square shape in a plan view. Specifically, the second screw attaching sections 422 and the holes 429 are formed in a substantially cubic shape in a plan view, the inner surface and the outer surface of the respective four sides opposing each other. Even with this kind of configuration, sufficient holding force and a narrower frame as with Embodiment 1 mentioned above are possible, and the position of the light guide plate 416 can be fixed appropriately.

<Embodiment 6>

Embodiment 6 of the present invention will be described with reference to FIG. 21. Embodiment 6 shows a case in which the form of the holes 529 is different from that of Embodiment 5. Descriptions of structures, operations, and effects similar to those of Embodiment 5 will be omitted.

Figure 21:
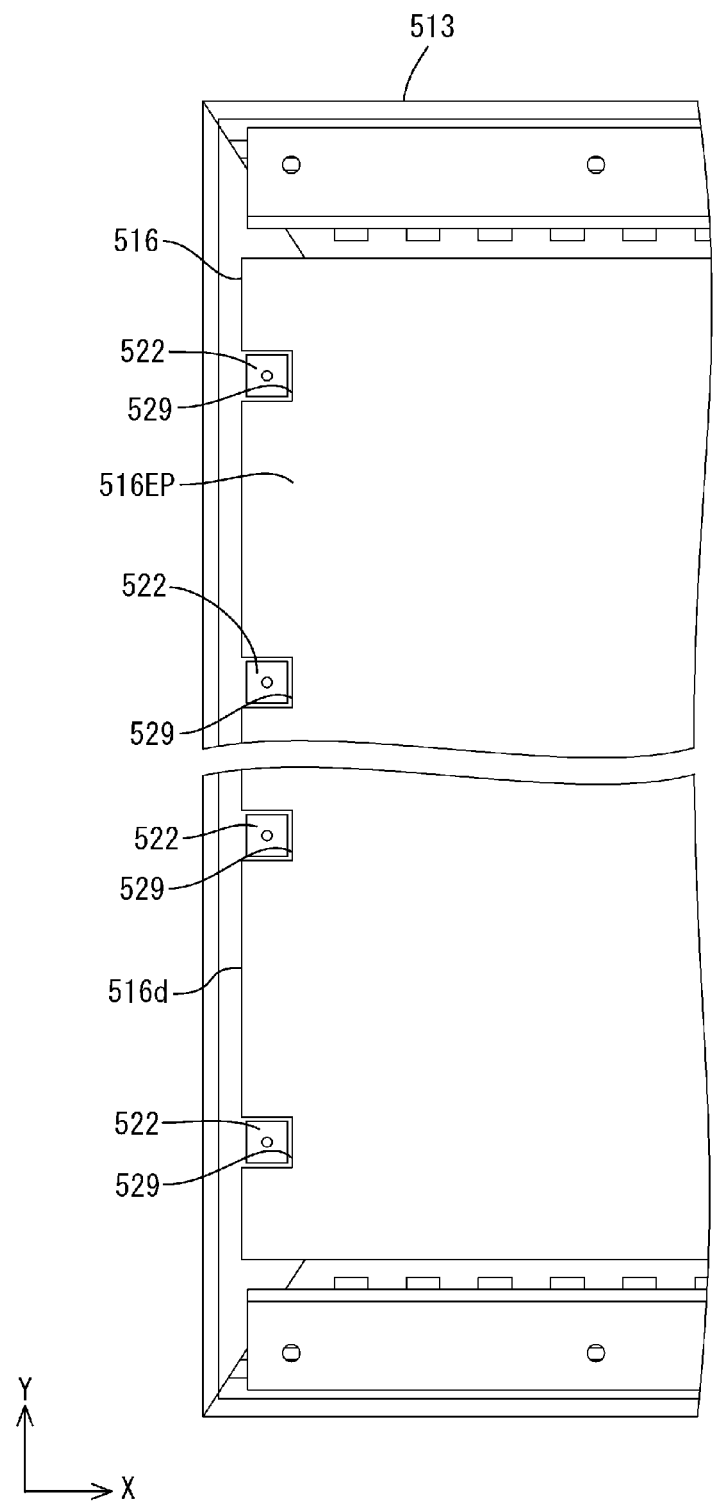
FIG. 21 is an enlarged view of the rear of the frame when an LED unit, a light guide plate, and the like according to Embodiment 6 are assembled to the frame.

As shown in FIG. 21, the holes 529 of the present embodiment penetrate the edge portions 516EP in the shorter side of the light guide plate 516 along the plate thickness direction (Z axis direction), and are open towards the outside along the longer side direction (X axis direction). In other words, the holes 529 are formed by opening a side of the edges of the edge portions 516EP of the light guide plate 516 to form a recess in a portion of the LED non-facing edge faces 516d. The entire second screw attaching section 522 is inserted into the hole 529, and three outer surfaces that are not the outer surfaces that face outside along the X axis direction oppose three inner surfaces of the holes 529. Therefore, the second screw attaching sections 522 are disposed farther towards the inside in the X axis direction than the LED non-facing edge face 516d of the light guide plate 516.

With such configuration, similarly to Embodiment 3, the holes 529 can have the second screw attaching sections 522 be inserted therein in the Z axis direction and engage with the screw attaching sections 522 in the X axis direction. Therefore, during assembly, the second screw attaching sections 522 can be inserted in the holes 529 using the method to attach the light guide plate 516 to the frame 513 along the Z axis direction or using the method in which the light guide plate 516 is slid into the frame 513 along the X axis direction (plate surface). Due to this, the assembly procedure of the light guide plate 516 has more variety, which can lead to improved work efficiency and the like.

<Embodiment 7>

Embodiment 7 of the present invention will be described with reference to FIG. 22. In Embodiment 7, a case in which the positions of second screw attaching sections 622 and holes 629 are changed is shown. Descriptions of structures, operations, and effects similar to those of Embodiment 6 will be omitted.

Figure 22:
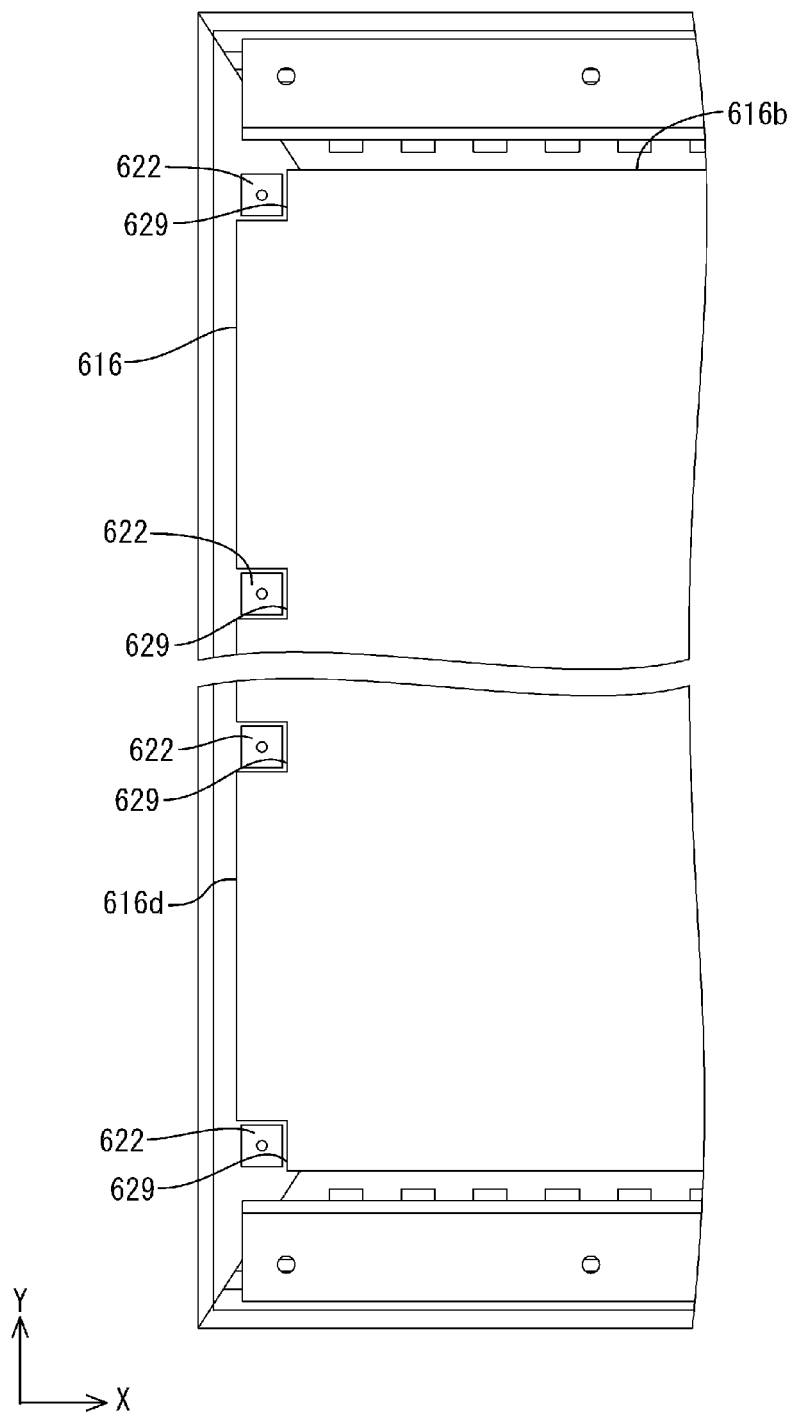
FIG. 22 is an enlarged view of the rear of the frame when an LED unit, a light guide plate, and the according to Embodiment 7 are assembled to the frame.

As shown in FIG. 22, the holes 629 of the present embodiment include the holes 629 formed on the corners of the light guide plate 616. Specifically, by having the respective four corners of the light guide plate 616 cut out, the light guide plate 616 is penetrated along the plate thickness direction (Z axis direction) and has holes 629 that are open towards the outside and that are formed along the longer side direction (X axis direction) and the shorter side direction (Y axis direction). The holes 629 formed on the corners of the light guide plate 616 have second screw attaching sections 622 inserted in the entire area, with two outer surfaces of the second screw attaching sections 622 facing inwards along the X axis direction and the Y axis direction to oppose two inner surfaces of the holes 629. Therefore, the second screw attaching sections 622 are disposed farther towards the inside in the X axis direction than the LED non-facing edge face 616d of the light guide plate 616, and are disposed farther inwards than the light receiving face 616b in the Y axis direction.

Other Embodiments

The present invention is not limited to the embodiments shown in the drawings and described above, and the following embodiments are also included in the technical scope of the present invention, for example.

(1) In Embodiments 1 to 4, the plan view shape of the second screw attaching sections and the holes was shown as being circular, but the plan view shape of the second screw attaching sections and the holes can be elliptical or the like, for example.

(2) In Embodiments 5 to 7, the plan view shape of the second screw attaching sections and the holes was shown as a cubic shape, but the plan view shape of the second screw attaching sections and the holes of the present invention can be a horizontally-long quadrangular shape, a vertically-long quadrangular shape, or a polygon such as a diamond, a triangle, or a polygon having five or more sides, or the like, for example.

(3) In the above-mentioned respective embodiments, the second screw attaching sections and the holes had matching plan view shapes, but it is possible to have the plan view shapes not match. It is also possible to make the plan view shape of the holes circular and to make the plan view shape of the second screw attaching sections inserted therein a quadrangular shape. It is also possible to make the plan view shape of the holes to be a quadrangular shape and the plan view shape of the second screw attaching sections inserted therein to be a circular shape.

(4) In Embodiment 4, the second screw attaching sections in which approximately half thereof was inserted into the holes was shown, but the proportion of the second screw attaching sections being inserted into the holes can be appropriately changed into one third, two thirds, or the like, for example.

(5) It is possible to apply the configuration in Embodiment 4 (a configuration in which a portion of the second screw attaching sections protrudes outside of the holes) and the configuration mentioned in (4) to the configurations mentioned in Embodiments 6 and 7.

(6) The configurations mentioned in Embodiments 4 to 7 and the configuration mentioned in (5) can be applied to the second holes of the optical members in a similar manner.

(7) In the respective embodiments, the number of second screw attaching sections and holes provided on a shorter side portion of the frame (first cabinet) and the light guide plate is four, but can be a number other than four (three and below, or five and above).

(8) The specific positions of the holes and the second screw attaching sections on the shorter side portion of the frame (first cabinet) and the light guide plate can be appropriately changed and be different from that of the respective embodiments above.

(9) In the respective embodiments above, a configuration that has the second screw attaching sections (fastening member attaching sections) inserted into the holes of the light guide plate is shown, but the second screws (fastening members) can be inserted into the holes of the light guide plate.

(10) In the respective embodiments above, holes were formed only on the light guide plate, but the edge portions of the optical members can be extended so as to overlap with the edge portions of the light guide plate in a plan view, and the edge portions of the optical members have second holes that are continuous with the holes of the light guide plate, so that the second screw attaching sections (fastening member attaching sections) are inserted into the holes and the second holes.

(11) In the respective embodiments above, a configuration in which the LED units (LED substrates) are disposed as a pair so as to respectively face the edge portions of the longer sides of the light guide plate was shown as an example, but the present invention also includes the LED units being disposed as a pair so as to respectively face the edge portions of both shorter sides of the light guide plate, for example. In this case, it is preferable that the second screw attaching sections and the holes be formed on the longer side portion of the frame (first cabinet) and the light guide plate where the LED units are not disposed.

(12) Other than the configurations in (11), the LED units (LED substrates) may be disposed so as to oppose one of the edge portions on the longer side of the light guide plate or one of the edge portions on the shorter side. In this case, it is preferable that the second screw attaching sections and the holes be formed on two sides or three sides of the frame (first cabinet) and the light guide plate, but the second screw attaching sections and the holes can be provided on one side only.

(13) Other than the configurations in (11) and (12), the present invention includes configurations with the LED units (LED substrates) opposing respective three sides of the edge portions of the light guide plate. In this case, it is preferable that the second screw attaching sections and the holes be formed on only one side of the light guide plate where the LED units are not disposed.

(14) Other than the configurations in (11) to (13), the present invention includes configurations with the LED units (LED substrates) opposing all four sides of the edge portions of the light guide plate. In this case, it is preferable that the second screw attaching sections and the holes be formed only on the corners of the frame (first cabinet) and the light guide plate.

(15) The configuration in (14) that provided the second screw attaching sections and the holes on the frame (first cabinet) and the light guide plate is also applicable to a configuration in which the LED units (LED substrates) are disposed so as to oppose one, two, or three sides of the edge portions of the light guide plate.

(16) In the respective embodiments above, a configuration in which the second screw attaching sections, the holes, and the gate-side flexible substrates are aligned alternately was shown, but a plurality respectively of the second screw attaching sections and the holes may be aligned in continuously, and a plurality of the gate-side flexible substrates may be aligned continuously.

(17) In the respective embodiments above, configurations with second screw attaching sections, holes, and gate-side flexible substrates that are disposed so as to be aligned along the Y axis direction were shown, but the present invention also includes configurations in which second screw attaching sections and holes are provided on the longer side portion of the frame and the light guide plate and arranged along the X axis direction on the source-side flexible substrates. This configuration can be applied to (16) as well.

(18) In the respective embodiments above, embodiments using screws as fastening members were shown, but other fastening members such as rivets may be used.

(19) In the respective embodiments above, configurations in which second screw attaching sections are provided on a frame or a first cabinet disposed on the front side and in which screws are attached to the chassis or the second cabinet from the rear were shown, but the present invention also includes configurations with second screw attaching sections being provided on a chassis or a second cabinet, and in which second screws are attached to the frame or the first cabinet from the front side. In this case, the assembling process will be such that after a light guide plate, optical members, and a liquid crystal panel are stacked one after another onto the chassis or the second cabinet from the front side, the frame is assembled thereto, and then the second screws are screwed into the chassis or the second screw attaching sections of the second cabinet from the front side of the frame or the first cabinet. At this time, the configuration can be such that the second screw attaching sections of the chassis or the second cabinet are inserted into the holes of the light guide plate, or the position of the light guide plate can be fixed by inserting the second screws into the holes of the light guide plate.

(20) In the above respective embodiments, a configuration in which one of the edge portions in the longer side of the liquid crystal panel connected to source-side flexible substrates is shown, but there may also be a configuration in which respective source-side flexible substrates are connected to a pair of edge portions on the longer side. Similarly, respective gate-side flexible substrates may be connected to a pair of edge portions on the shorter side of the liquid crystal panel.

(21) Other than the respective embodiments above, the present invention includes configurations without gate-side flexible substrates, source-side flexible substrates, or both.

(22) In the respective embodiments (excluding Embodiment 3) above, configurations in which the frame and the chassis are the exterior members forming the exterior of the liquid crystal display device were shown as examples, but the present invention also includes a configuration in which the chassis is not exposed to the outside by covering the rear surface thereof with a separately provided external member, for example.

(16) In the respective embodiments (excluding Embodiment 3) above, the frame and the chassis constituting the exterior member were both made of a metal, but the present invention also includes a configuration in which one or both of the frame and the chassis are made of a synthetic resin. It is preferable that this configuration be applied to a mid- to small-sized model that does not require the liquid crystal display device to have very high mechanical strength.

(24) In the respective embodiments above, the power supply board was provided with the function of powering the LEDs, but the present invention also includes a configuration in which an LED driver board that powers the LEDs is separate from the power supply board.

(25) In the respective embodiments above, the main board was provided with a tuner part, but the present invention also includes a configuration in which a tuner board that has a tuner part is separate from the main board.

(26) In the respective embodiments above, the colored portions of the color filters provided in the liquid crystal panel included the three colors of R, G, and B, but it is possible to have the colored portions include four or more colors.

(27) In the respective embodiments above, LEDs were used as the light source, but other types of light source such as an organic EL may also be used.

(28) In the respective embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(29) In the respective embodiments above, a liquid crystal display device using a liquid crystal panel as a display panel was described as an example, but the present invention can be applied to a display device that uses another type of display panel.

(30) In the respective embodiments above, a television receiver that includes a tuner part was illustratively shown, but the present invention is also applicable to a display device without a tuner part. Specifically, the present invention can also be applied to liquid crystal display devices used as digital signage and electronic boards.

REFERENCE CHARACTERS 10, 210 liquid crystal display device (display device)
11, 211 liquid crystal panel (display panel)
11c, 211c display surface
11EP, 211EP edge portion
12, 212 backlight device (illumination device)
13, 113, 313, 513 frame (a holding portion)
14 chassis (another holding portion)
16, 116, 216, 316, 416, 416, 516, 616 light guide plate
16b, 616b light receiving face (light source facing edge face)
16d, 316d, 616d LED non-facing edge face (light source non-facing edge face)
16EP, 116EP, 216EP, 316EP, 516EP edge portion
17 LED (light source)
22, 122, 222, 322, 422, 522, 622 second screw attaching section (fastening member attaching section)
24 panel pressing member
28 gate-side flexible substrate (panel connecting member, gate driver)
29, 129, 229, 329, 429, 529, 629 hole
31 supporting portion
32 first cabinet (outer holding portion)
34 inner frame (inner holding portion, a holding portion)
33 second cabinet (another holding portion)
35 inner chassis (another holding portion)
36 attaching section insertion holes (insertion holes)
224A first panel pressing member (panel pressing member)
224B second panel pressing member (panel pressing member)
HM holding portion
SM2 second screw (fastening member)
TV television receiver

What is claimed is:

1. A display device, comprising:
a light source;
a display panel that performs display with light from the light source;
a light guide plate disposed below the display panel, the light guide plate being disposed such that an edge face thereof faces the light source and such that an edge portion thereof is arranged further outside than an edge portion of the display panel;
a holding member including a pair of holding portions that holds and sandwiches the display panel and the light guide plate from a display surface side and a side opposite to the display surface side, the holding member housing the light source between the pair of holding portions;
a panel pressing member provided on one of the pair of holding portions disposed on the display surface side of the display panel, the panel pressing member pressing the display panel from the display surface side;
a fastening member attaching section provided on one holding portion of the pair of holding portions; and
a fastening member attached to the fastening member attaching section, the fastening member holding at least another holding portion of the pair of holding portions with the fastening member attaching section so as to fix together the pair of holding portions,
wherein a hole is provided in the edge portion of the light guide plate where either the fastening member attaching section or the fastening member is inserted.

2. The display device according to claim 1, wherein the fastening member is attached to the fastening member attaching section along a direction in which the display panel and the light guide plate are layered.

3. The display device according to claim 2,
wherein the one holding portion is disposed on the display surface side of the display panel and said another holding portion is disposed on the side opposite to the display surface side of the light guide plate, and
wherein the fastening member is attached to the fastening member attaching section from the side opposite to the display surface side.

4. The display device according to claim 3, wherein the pair of holding portions are exterior members that constitute an outer form of the display device.

5. The display device according to claim 3, wherein the fastening member attaching section is in contact with the edge portion of the display panel so as to fix the position of the display panel in directions along a display surface.

6. The display device according to claim 3, wherein the fastening member attaching section is inserted into the hole provided in the edge portion of the light guide plate so as to be in contact with an inner surface thereof, and fixes the position of the light guide plate in directions along the surface thereof.

7. The display device according to claim 6, wherein the fastening member attaching section is provided with a supporting portion that supports the edge portion of the light guide plate from a side opposite to the fastening member.

8. The display device according to claim 1,
wherein the one holding portion has an inner holding portion made of a metal that is disposed towards an inside and an outer holding portion made of a synthetic resin that is disposed outside of the inner holding portion, and
wherein the fastening member attaching section is provided so as to protrude from the outer holding portion in a direction towards the edge portion of the light guide plate, and the inner holding portion has an insertion hole where the fastening member attaching section is inserted.

9. The display device according to claim 8,
wherein the one holding portion is disposed towards the display surface side of the display panel, and
wherein the fastening member attaching section is in contact with the edge portion of the display panel so as to fix the position of the display panel in directions along a display surface.

10. The display device according to claim 1,
wherein the light guide plate has a light source facing edge face that is disposed so as to face the light source and a light source non-facing edge face that does not face the light source, and
wherein the edge portion of the light guide plate has the light source non-facing edge face and the hole.

11. The display device according to claim 1, wherein the hole has an inner surface that is in contact with either the fastening member attaching section or the fastening member, and fixes the position of the light guide plate in directions along the surface thereof.

12. The display device according to claim 1, further comprising a panel connecting member connected to the edge portion of the display panel and disposed so as to protrude outward from the edge portion,
wherein the fastening member and the fastening member attaching section are together aligned with respect to the panel connecting member along the edge portion of the display panel.

13. The display device according to claim 12,
wherein there exists a plurality of said fastening members, a plurality of said fastening members attaching sections, and a plurality of said panel connecting members,
wherein a pair of the plurality of the fastening members and the plurality of the fastening member attaching sections, and the plurality of the panel connecting members are disposed alternately to be aligned along the edge portion of the display panel.

14. The display device according to claim 1, wherein the display panel is a liquid crystal panel including a pair of substrates with liquid crystal sealed therebetween.

15. A television receiver, comprising the display device according to claim 1.

* * * * *